United States Patent
Sirotkin

(10) Patent No.: US 11,265,884 B2
(45) Date of Patent: Mar. 1, 2022

(54) SYSTEMS, METHODS AND DEVICES FOR UPLINK BEARER AND ACCESS CATEGORY MAPPING

(71) Applicant: Apple Inc., Cupertino, CA (US)

(72) Inventor: Alexander Sirotkin, Hod Hasharon (IL)

(73) Assignee: APPLE INC., Cupertino, CA (US)

(*) Notice: Subject to any disclaimer, the term of this patent is extended or adjusted under 35 U.S.C. 154(b) by 454 days.

(21) Appl. No.: 16/326,652

(22) PCT Filed: Jun. 22, 2017

(86) PCT No.: PCT/US2017/038804
§ 371 (c)(1),
(2) Date: Feb. 19, 2019

(87) PCT Pub. No.: WO2018/063461
PCT Pub. Date: Apr. 5, 2018

(65) Prior Publication Data
US 2021/0266915 A1    Aug. 26, 2021

Related U.S. Application Data

(60) Provisional application No. 62/402,870, filed on Sep. 30, 2016.

(51) Int. Cl.
*H04L 1/00*    (2006.01)
*H04W 72/08*    (2009.01)
(Continued)

(52) U.S. Cl.
CPC ......... *H04W 72/085* (2013.01); *H04L 5/0055* (2013.01); *H04W 28/0252* (2013.01); *H04W 72/042* (2013.01); *H04W 84/12* (2013.01)

(58) Field of Classification Search
None
See application file for complete search history.

(56) References Cited

U.S. PATENT DOCUMENTS

2015/0312831 A1* 10/2015 Sang ..................... H04W 24/08
370/236
2016/0234851 A1* 8/2016 Zhang ................... H04W 28/08
(Continued)

FOREIGN PATENT DOCUMENTS

WO    2017030420 A1    2/2017

OTHER PUBLICATIONS

Intel Corporation, "[Draft] LS on QoS mapping for eLWA UL", R2-165903, 3GPP TSG-RAN WG2 #95, Gothenburg, Sweden, Aug. 22-26, 2016, 7 pages.
(Continued)

*Primary Examiner* — Phirin Sam
(74) *Attorney, Agent, or Firm* — Stoel Rives LLP

(57) ABSTRACT

Mapping information of a bearer or quality of service can be communicated from a Wireless Local Area Network Termination (WT) to the enhanced Node B (eNB), which then uses radio resource control (RRC) signaling to communicate the mapping to the user equipment (UE). For example, three options can be used to communicate mapping information: (1) Operations and Management (OAM), (2) Semi-static Xw-AP signaling (e.g., WT Configuration Update or Xw Setup procedures) or (3) Dynamic Xw-AP procedures (e.g., WT Addition Request procedure). In some embodiments, the mapping can be signaled by (1) bearer to wireless local area networks (WLAN) access category (AC) mapping or (2) long term evolution (LTE) quality of service class identifier (QCI) to WLAN AC mapping.

17 Claims, 15 Drawing Sheets

(51) Int. Cl.
  *H04L 5/00*    (2006.01)
  *H04W 28/02*   (2009.01)
  *H04W 72/04*   (2009.01)
  *H04W 84/12*   (2009.01)

(56) References Cited

U.S. PATENT DOCUMENTS

| | | | |
|---|---|---|---|
| 2016/0337904 A1* | 11/2016 | Hsu | H04W 8/205 |
| 2016/0338128 A1* | 11/2016 | da Silva | H04W 8/20 |
| 2017/0055313 A1* | 2/2017 | Sharma | H04W 36/0066 |
| 2017/0367141 A1* | 12/2017 | Nagasaka | H04W 76/16 |
| 2018/0132143 A1* | 5/2018 | Sirotkin | H04W 88/06 |
| 2018/0206282 A1* | 7/2018 | Singh | H04W 88/06 |
| 2018/0227976 A1* | 8/2018 | Dudda | H04W 36/125 |
| 2018/0324826 A1* | 11/2018 | Iskander | H04W 76/30 |
| 2019/0104439 A1* | 4/2019 | Shi | H04W 28/085 |
| 2021/0219203 A1* | 7/2021 | Agarwal | H04W 24/02 |

OTHER PUBLICATIONS

Intel Corporation, et al., "Remaining control plane aspects of LWA", R3-152445, 3GPP TSG-RAN WG3 Meeting #90, Anaheim, California, U.S.A., Agenda Item 15.4, Nov. 16-20, 2015, 2 pages.
Nokia, et al., "Access Category information for uplink LWA bearers", R3-162181, 3GPP TSG-WG3 Meeting #93bis, Sophia Antipolis, France, Oct. 10-14, 2016, 4 pages.
PCT/US2017/038804, International Search Report and Written Opinion, Sep. 21, 2017, 15 pages.

\* cited by examiner

SYSTEMS, METHODS AND DEVICES FOR UPLINK BEARER AND ACCESS CATEGORY MAPPING

RELATED APPLICATION

This application is a national stage filing under 35 U.S.C. § 371 of International Patent Application No. PCT/US2017/038804, filed Jun. 22, 2017, which claims the benefit under 35 U.S.C. § 119(e) of U.S. Provisional Application No. 62/402,870 filed Sep. 30, 2016, each of which is incorporated by reference herein in its entirety.

TECHNICAL FIELD

The present disclosure relates to cellular communications and more specifically to Long Term Evolution-Wireless Local Area Network Aggregation (LWA) uplink (UL) bearer and access category (AC) mapping.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or radio network controller (RNC) in an E-UTRAN, which communicate with a wireless communication device, known as user equipment (UE). In fifth generation (5G) wireless RANs, RAN Nodes can include a 5G Node.

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN 104 implements GSM and/or EDGE RAT, the UTRAN 106 implements Universal Mobile Telecommunication System (UMTS) RAT or other 3GPP RAT, and the E-UTRAN 108 implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

Figure 1:
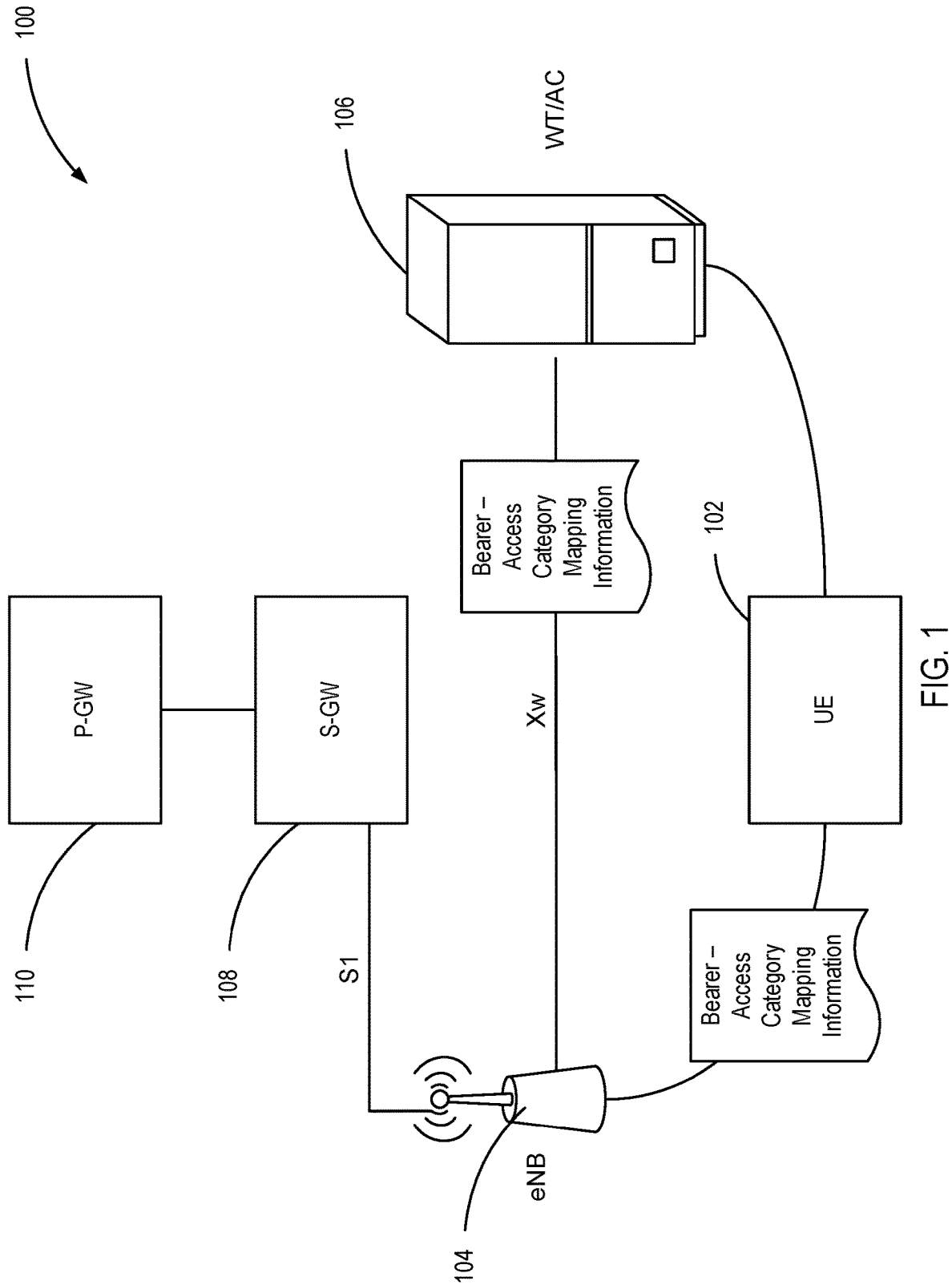
FIG. 1 is a diagram illustrating a Long Term Evolution-Wireless Local Area Network Aggregation (LWA) system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable mapping information to be communicated from the Wireless Local Area Network Termination (WT) to the enhanced node B (eNB), which then uses radio resource control (RRC) signaling to communicate the mapping to the user equipment (UE). For example, three options can be used to communicate mapping information: (1) Operations and Management (OAM), (2) Semi-static Xw-AP signaling (e.g., WT Configuration Update or Xw Setup procedures) or (3) Dynamic Xw-AP procedures (e.g., WT Addition Request procedure). In some embodiments, the mapping can be signaled by (1) bearer to wireless local area networks (WLAN) access category (AC) mapping or (2) long term evolution (LTE) quality of service class identifier (QCI) to WLAN AC mapping.

Enhanced Long Term Evolution-Wireless Local Area Network Aggregation (eLWA) can define an uplink (UL) bearer split and UL aggregation support for a Long Term Evolution-Wireless Local Area Network Aggregation (LWA). Quality of service (QoS) mapping in downlink (DL) can define how the UE is expected to map LTE QCI to WLAN AC. The network can have the control over UE QoS mapping. In DL, the mapping is performed by the WT, and the WT can be in control of UL mapping as well. Mapping information is communicated from the WT to the eNB, which then uses RRC signaling to communicate the mapping to the UE.

In the current LTE specification, the UL QoS mapping procedure is not defined. Mapping of QoS between LTE and WLAN can be defined in two ways: (1) LTE data radio bearer identifier (DRB ID) to WLAN AC or (2) LTE QCI to WLAN AC. When this mapping is communicated to the UE, for every LTE-WLAN aggregation adaptation protocol (LWAAP) protocol data unit (PDU) sent via WLAN the UE can determine both a DRB ID and a QCI, and the UE is able to assign the appropriate WLAN AC when transmitting the packet.

Signaling Option 1

In this option the mapping is configured by the OAM directly to the eNB, without signaling on the Xw interface. In the other options, the network can signal on the Xw control plane interface from the WT to the eNB with the Xw-AP protocol.

Signaling Option 2

Since the mapping is unlikely to change frequently, using Xw-AP signaling can be used to convey semi-static information (e.g., a configuration). Two candidate messages for this option include: Xw Setup Response and WT Configuration Update. In this option the mapping used by the WT is signaled once. After this signaling, the eNB assumes that the WT uses the same mapping for bearers of the UEs.

For example, a WT Configuration Update message is sent by a WT to an eNB to transfer updated information for a transport network layer (TNL) association. The direction is from a WT to an eNB.

| IE/Group Name | Presence | Range | IE Type and Reference | Semantics Description | Criticality | Assigned Criticality |
|---|---|---|---|---|---|---|
| QoS Map List | | 0 . . . 1 | | List of QCI to WLAN AC mapping | GLOBAL | reject |
| >QoS Map Item | | 1 . . . 255 | | | | |
| >QCI | M | | INTEGER (0 . . . 255) | QoS Class Identifier defined in TS 23.401. Logical range and coding specified in TS 23.203. | | |
| >AC | M | | ENUMERATED (ACBK, ACBE, AC-VI, AC-VO) | WLAN access category. AC-BK corresponds to Background access category, AC-BE corresponds to Best Effort access category, AC-VI corresponds to Video access category and AC-VO corresponds to Voice access category as defined by IEEE 802.11-2012. | | |

Note that in option 2 above the information communicated (i.e., the mapping) is QCI to AC. The eNB can translate this mapping to DRB id to AC mapping, for the UE in the RRC signaling.

Signaling Option 3

In this option, WT Addition Request Acknowledge and WT Modification Request Acknowledge procedures are used to communicate the mapping on a per bearer basis. The advantage of this option is that the eNB does not need to translate the mapping (from QCI-to-AC to DRB-ID-to-AC), at the expense of more frequent Xw-AP signaling. The example of WT Addition Request Acknowledge message enhancement (adding a mapping from QCI-to-AC to DRB-id-to-AC) is shown below. A WT Modification Request Acknowledge message can be enhanced in a similar fashion.

A WT Addition Request Acknowledge message is sent by the WT to confirm to the eNB about the WT addition preparation. The direction is from WT to eNB.

| IE/Group Name | Presence | Range | IE Type and Reference | Semantics Description | Criticality | Assigned Criticality |
|---|---|---|---|---|---|---|
| >AC | M | | ENUMERATED (AC-BK, AC-BE, ACVI, AC-VO) | WLAN access category. AC-BK corresponds to Background access category, AC-BE corresponds to Best Effort access category, AC-VI Corresponds to Video access category and AC-VO corresponds to Voice access category as defined by IEEE 802.11-2012. | | |

FIG. 1 is a diagram illustrating a LWA system 100 consistent with embodiments disclosed herein. An eNB 104 indicates that a bearer has been created to a WT 106 over the Xw link. The WT 106 indicates a mapping of a QoS between the eNB link and WT link for the bearer over the Xw link. In some embodiments, this mapping is a bearer identifier (e.g., DRB ID) and a WLAN AC. The eNB 104 communicates the mapping to a UE 102. Traffic to the core network (e.g., packet gateway (P-GW) 110 or serving gateway (S-GW) 108 goes through the eNB 104 (directly from the UE 102 or from the UE 102 through the WT 106).

Figure 2:
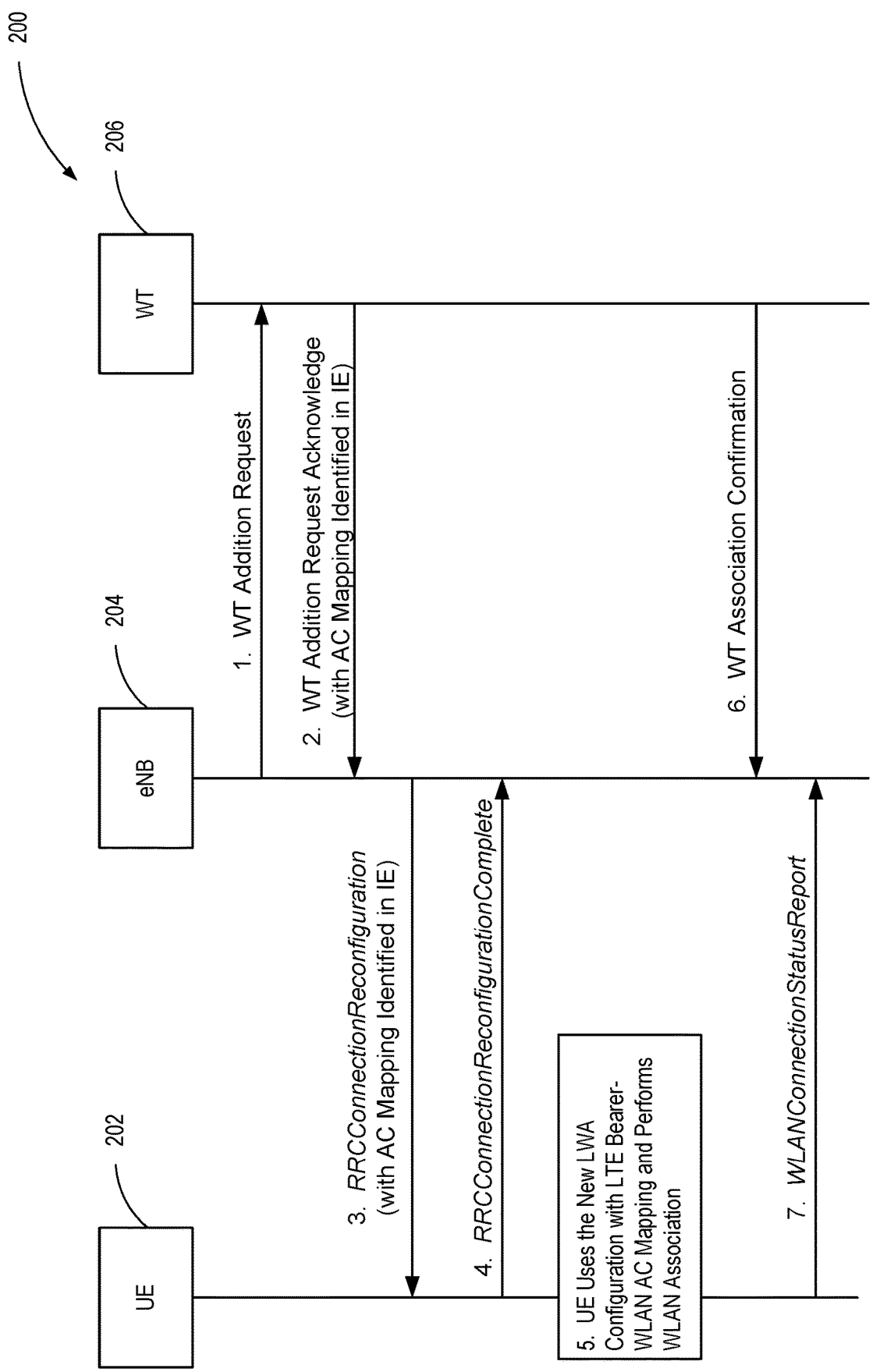
FIG. 2 is a communication diagram illustrating a Wireless Local Area Network Termination (WT) Addition Request consistent with embodiments disclosed herein.

FIG. 2 is a communication diagram 200 illustrating a WT Addition Request consistent with embodiments disclosed herein. An eNB 204 sends a WT Addition Request message to a WT 206, which indicates formation of a DRB. The WT 206 indicates a mapping between the DRB and a WLAN AC in an information element (IE) to the eNB 204 using a WT Addition Request Acknowledge. The eNB 204 indicates the mapping between the DRB and the WLAN AC in a RRC-ConnectionReconfiguration message to a UE 202 using an IE. The UE sends a RRCConnectionReconfigurationComplete message to the eNB 204. The UE 202 can then use the LWA configuration and DRB-AC mapping and performs WLAN association. The WT 206 sends a WT Association Confirmation message to the eNB 204. The UE 202 sends a WLANConnectionStatusReport to the eNB 204. In some embodiments, the eNB 204 and WT 206 are separate devices. In other embodiments, the eNB 204 and WT 206 are virtual devices. In yet other embodiments, the eNB 204 and WT 206 are a single device.

Figure 3:
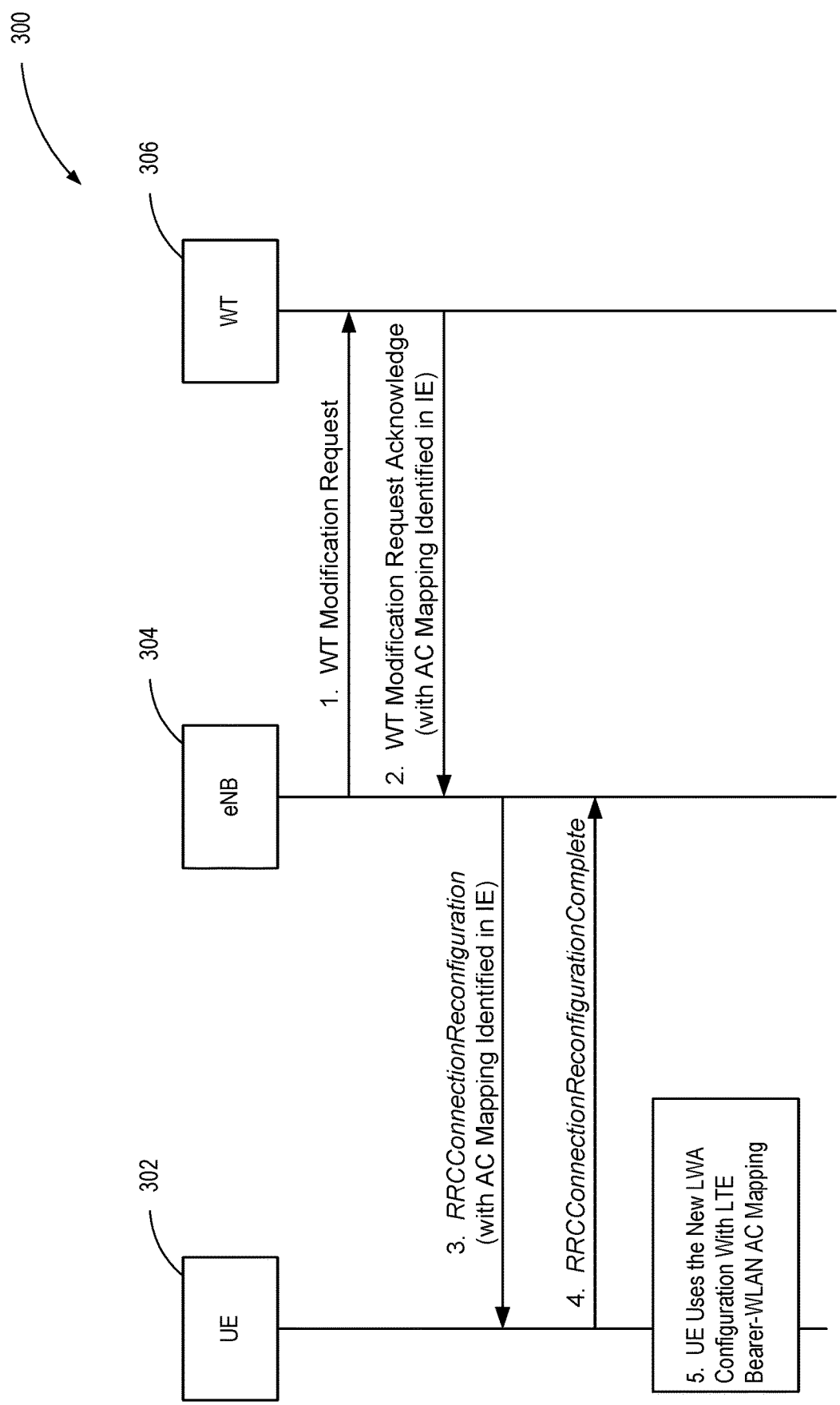
FIG. 3 is a communication diagram illustrating a WT Modification Request consistent with embodiments disclosed herein.

FIG. 3 is a communication diagram 300 illustrating a WT Modification Request consistent with embodiments disclosed herein. When a DRB is added or removed, an eNB 304 sends a WT Modification Request message to a WT 306, which indicates formation of a DRB and a request for a QoS mapping between LTE and WLAN (e.g., a DRB-AC mapping). The WT 306 indicates a mapping between the DRB and a WLAN AC in an IE to the eNB 304 using a WT Modification Request Acknowledge message. The eNB 304 indicates the mapping between the DRB and the WLAN AC in a RRCConnectionReconfiguration message to a UE 302 using an IE. The UE sends a RRCConnectionReconfigurationComplete message to the eNB 304. The UE 302 can then use the new LWA configuration and DRB-AC mapping and performs WLAN association.

Figure 4:
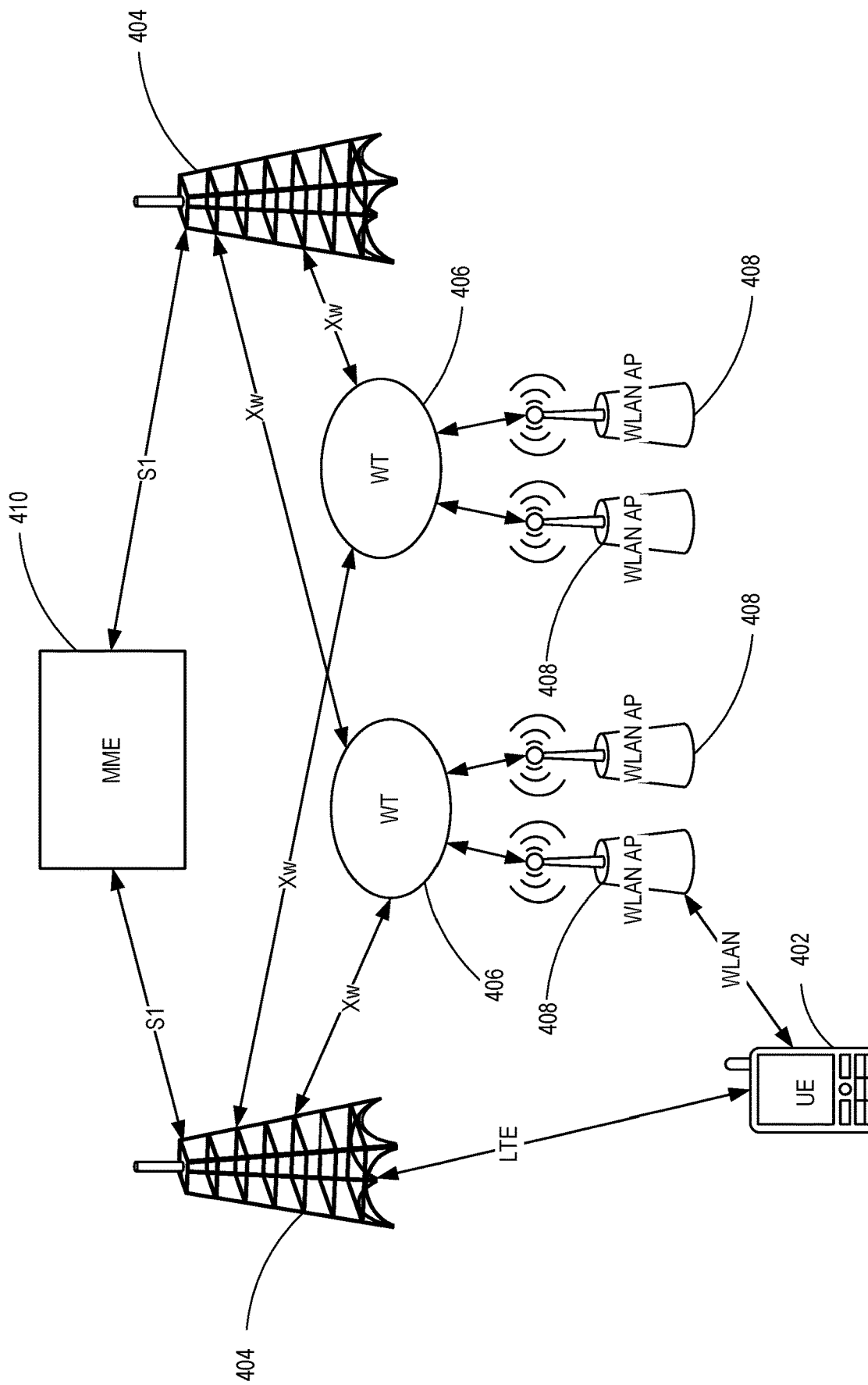
FIG. 4 is a diagram illustrating user equipment (UE) communication over long term evolution (LTE) and wireless local area networks (WLAN) consistent with embodiments disclosed herein.

FIG. 4 is a diagram illustrating UE communication over LTE and WLAN consistent with embodiments disclosed herein. A UE 402 can transmit and receive data over an LTE RAT with an eNB and over a WLAN RAT with a WLAN AP 408. Data sent to or received by the WLAN AP 408 can be administered by a WT 406. The WT 406 communicates with an eNB 404 over an Xw interface to coordinate data transmissions to and from the UE 402. The simultaneous connection of the UE 402 with the eNB 404 and WLAN AP 408 allows the eNB 404 to determine a routing of data to the UE 402 and to the core network, such as the mobility management entity (MME) 410. The eNB 404 can use the routing to improve network communication (e.g., reduce saturation of a RAN, etc.) and/or UE communication (e.g., respond to signal quality, etc.). The eNB 404 can also provide access to a core network and/or core network functions for the UE 402 through either the WLAN RAT or the LTE RAT.

In one embodiment, the eNB 404 can determine to transition the UE 402 from a source WT 406 to a target WT 406 (which can be based on information, such as signal quality, congestion and/or network characteristics like bandwidth, latency, congestion, etc.). The eNB 404 can generate a WT Addition Request message for a target WT 406 identifying the UE 402. The WT 406 can send a WT Addition Request Acknowledge message to the eNB 404. The eNB can generate a WT release request for a source WT 406 to release allocated WLAN resources for the UE 402. The eNB 404 can generate a connection reconfiguration request for the UE 402 identifying the target WT 406. The UE 402 can send a connection reconfiguration request complete message to the eNB 404 after associating with the target WT 406. The eNB 404 can receive an association confirmation message from the UE 402 or the target WT 406. When making changes, the eNB 404 can receive QoS mapping information from the WT 406.

Figure 5:
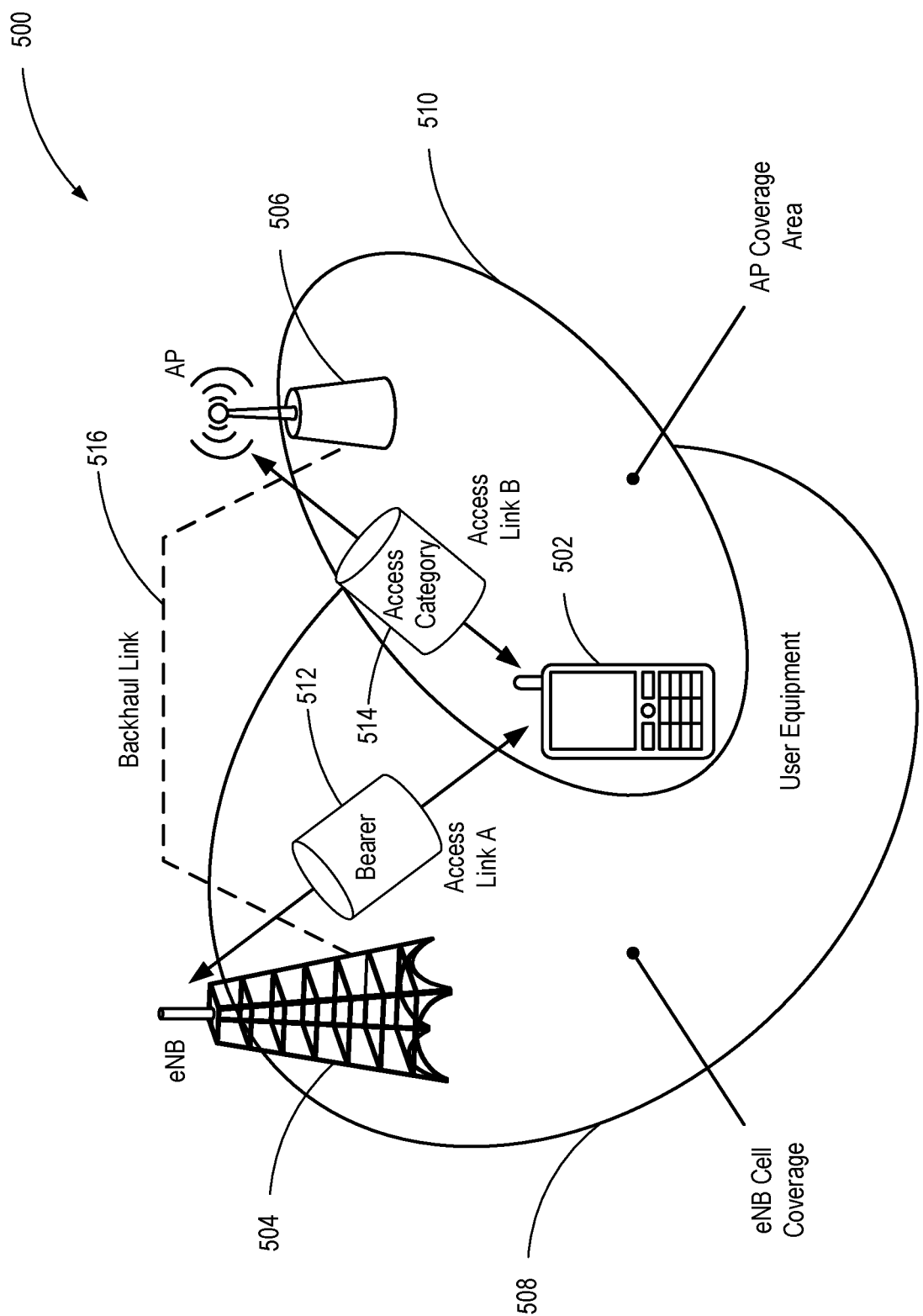
FIG. 5 is a diagram illustrating coverage areas of an enhanced node B (eNB) and an access point (AP) consistent with embodiments disclosed herein.

FIG. 5 is a diagram illustrating coverage areas of an eNB and an AP consistent with embodiments disclosed herein. An example is shown of a portion of a radio access network (RAN) system 500 that includes a single cellular air interface (such as an LTE/LTE-Advanced access link) being provided between an eNB 504 and a UE 502 (i.e., on Access Link A using bearer 512), and an air interface (a supplemental network interface such as a WLAN based interface) being provided between an access point (AP) 506 and the UE 502 (i.e., on Access Link B using an access category 514). UE 502 is located within eNB cell coverage 508 and AP coverage 510. The UE 502 determines that connection with a WLAN AP 506 will be beneficial to a user of the UE 502. In some embodiments, the UE 502 retains Access Link A to eNB 504. The UE 502 can offload some or part of wireless services onto Access Link A. In other embodiments, the UE 502 disconnects from Access Link A and moves wireless services to Access Link B. In some embodiments Access Link A and Access Link B use a same frequency and technology. In other embodiments, Access Link A and Access Link B use different frequencies (e.g., LTE licensed frequencies and unlicensed frequencies) and different link technology (e.g., LTE and Wi-Fi). In other embodiments, Access Link A and Access Link B use different frequencies and the similar link technology (e.g., LTE and LTE over mmWave). In some embodiments, more than one bearer 512 is used with each bearer 512 mapping to the access category 514.

Figure 6:
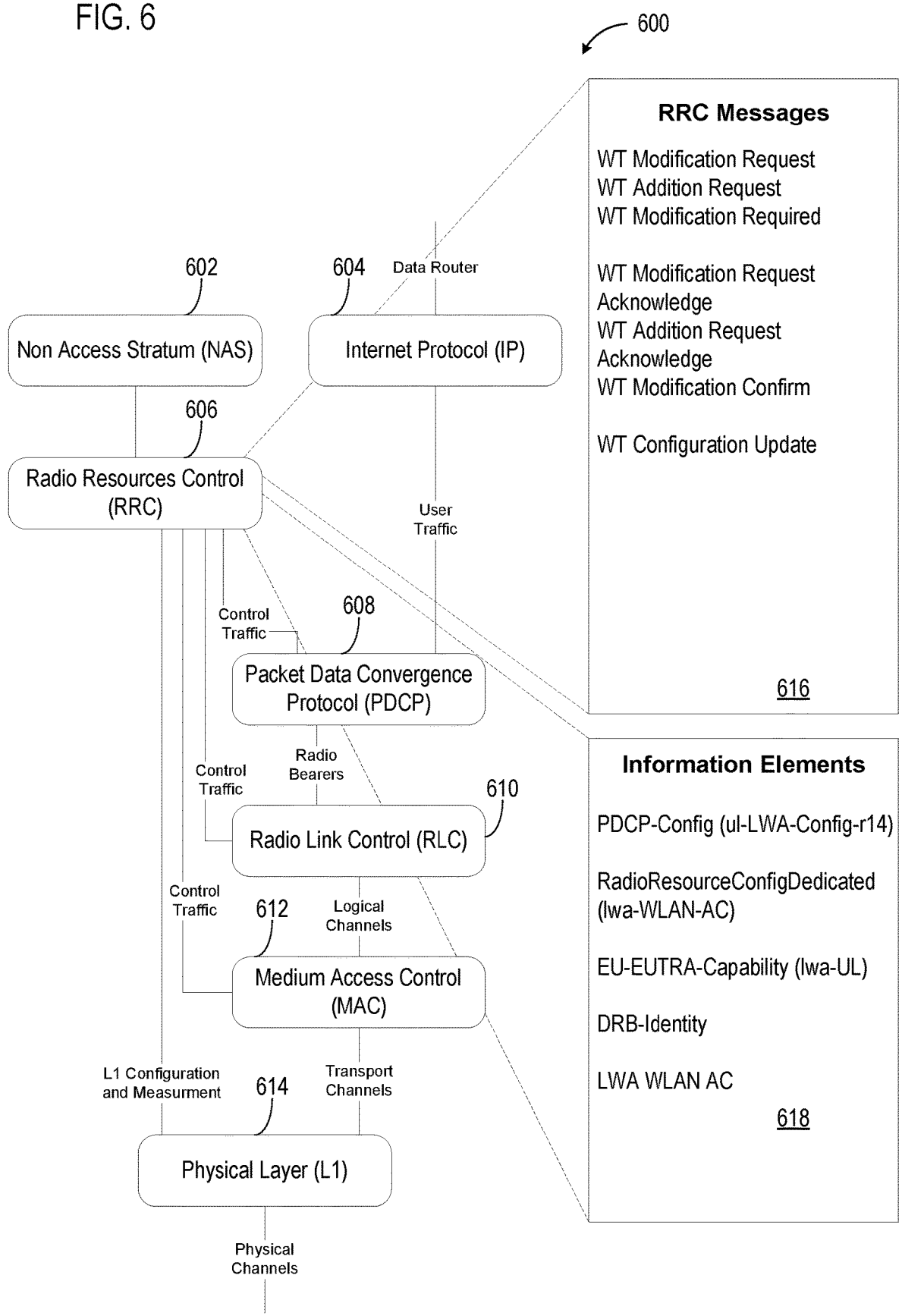
FIG. 6 is a diagram of an LTE protocol stack consistent with embodiments disclosed herein.

FIG. 6 is a diagram of an LTE protocol stack consistent with embodiments disclosed herein. Various embodiments described herein can also be used to expand, update, use and/or provide new functionality to existing wireless systems (e.g., radio access technology (RAT), radio access networks (RANs), Universal Terrestrial Radio Access Network (UTRAN), Evolved Universal Terrestrial Radio Access Network (E-UTRAN), etc.). An example of an enhanced LTE protocol stack 600 for a UE is shown. The protocol stack 600 can be enhanced with messages 616 with new information elements and measurements 618 for use in mapping of QoS between LTE and WLAN links.

The stack describes protocol layers in the enhanced LTE protocol stack 600. These layers can provide abstraction from a lower layer (represented as a layer closer to the bottom of the page). A physical layer (L1) 614 includes systems that translate physical signals into logical data for use by the higher layers. L1 can also provide measurement and configuration services to the RRC layer 606. A medium access control (MAC) layer 612 includes systems that perform transport as logical mapping and/or scheduling. The MAC layer 612 includes systems that can provide format selection and measurements about the network to the RRC layer 606. A radio link control (RLC) layer 610 includes systems that provide segmentation, concatenation and reassembly, and can operate in different modes depending on a radio bearer. A packet data convergence protocol (PDCP) layer 608 includes systems that can provide services for higher level protocols including cryptographic functions, header compression/decompression, sequence numbering and/or duplicate removal. User traffic can be sent through the PDCP layer 608 to an internet protocol (IP) layer 604, which is then routed to applications and systems of the UE for use. Control traffic can be sent to the RRC layer 606. The RRC layer 606 can provide management and control functions of the UE. The RRC layer 606 functionality can include processing of broadcast information, paging, connection management with an eNB, integrity protection of RRC messages, radio bearer control, mobility functions, UE measurement and reporting, QoS management, etc. A non-access stratum (NAS) layer 602 includes systems that can provide mobility management, call control, session management and/or identity management.

RRC messages that provide mapping information of QoS between eNB and WLAN communications can include WT Modification Request, WT Addition Request, WT Modification Required, WT Modification Request Acknowledge, WT Addition Request Acknowledge, WT Modification Confirm and/or WT Configuration Update. Information elements with QoS mapping fields can be provided through RRC messages, including PDCP-Config (ul-LWA-Config-r14), RadioResourceConfigDedicated (lwa-WLAN-AC), EU-EUTRA-Capability (lwa-UL), DRB-Identity and/or LWA WLAN AC.

Figure 7:
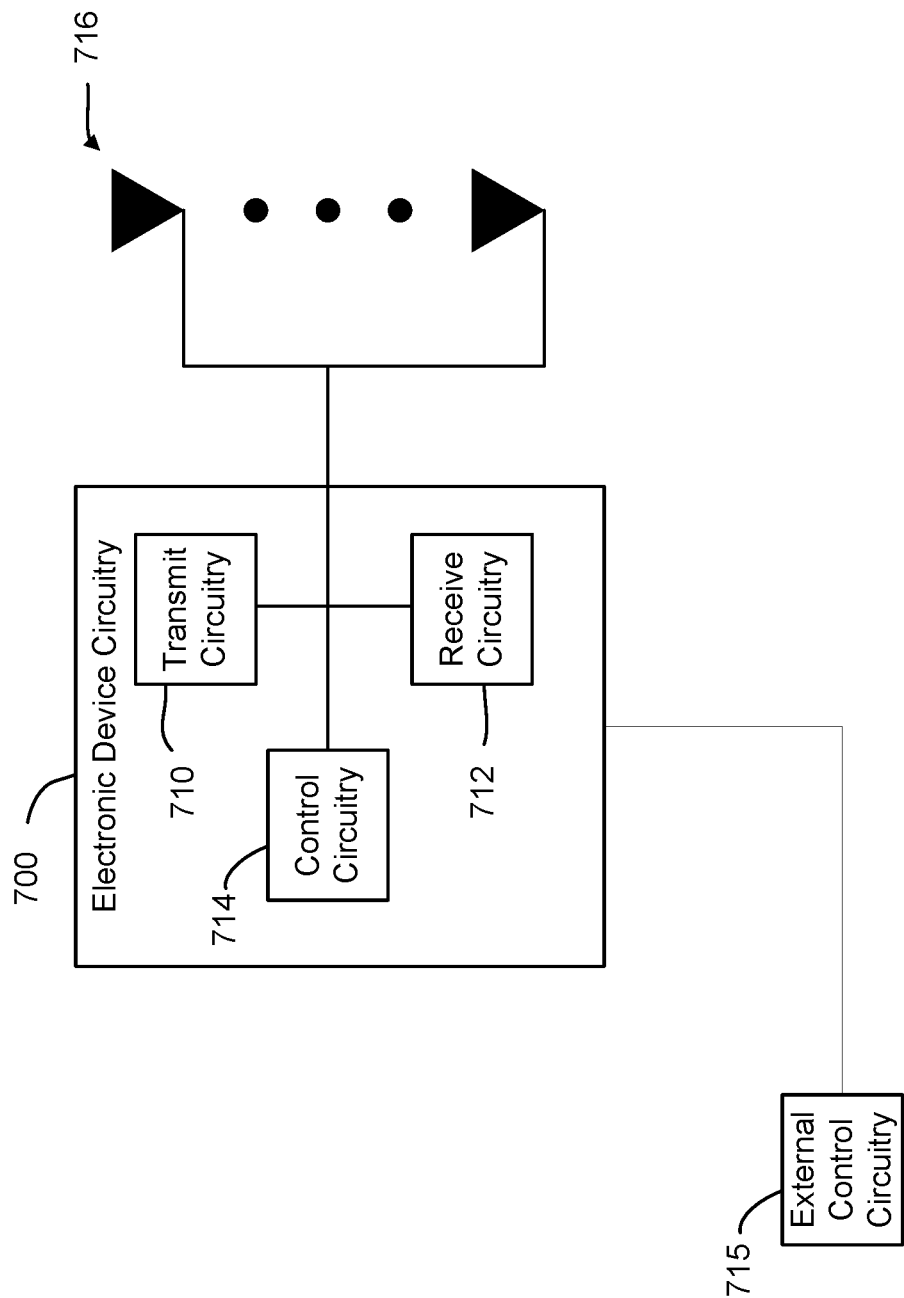
FIG. 7 is a block diagram illustrating electronic device circuitry that may be radio access network (RAN) node circuitry (such as an eNB circuitry), UE circuitry, network node circuitry, or some other type of circuitry consistent with embodiments disclosed herein.

FIG. 7 is block diagram illustrating electronic device circuitry 700 that may be radio access network (RAN) node circuitry (such as an eNB circuitry), UE circuitry, network node circuitry, or some other type of circuitry consistent with embodiments disclosed herein. In embodiments, the electronic device circuitry 700 may be, or may be incorporated into or otherwise a part of, a RAN Node (e.g., an eNB), a UE, a mobile station (MS), a base transceiver station (BTS), a network node, or some other type of electronic device. In embodiments, the electronic device circuitry 700 may include radio transmit circuitry 710 and receive circuitry 712 coupled to control circuitry 714 (e.g., baseband processor(s), etc.). In embodiments, the transmit circuitry 710 and/or receive circuitry 712 may be elements or modules of transceiver circuitry, as shown. In some embodiments, some or all of control circuitry 715 can be in a device separate or external from the transmit circuitry 710 and the receive circuitry 712 (baseband processors shared by multiple antenna devices, as in cloud-RAN (C-RAN) implementations, for example).

The electronic device circuitry 700 may be coupled with one or more plurality of antenna elements 716 of one or more antennas. The electronic device circuitry 700 and/or the components of the electronic device circuitry 700 may be configured to perform operations similar to those described elsewhere in this disclosure.

In embodiments where the electronic device circuitry 700 is or is incorporated into or otherwise part of a UE, the transmit circuitry 710 can transmit a RRCConnectionReconfigurationComplete message as shown in FIG. 2. The receive circuitry 712 can receive a RRCConnectionReconfiguration message as shown in FIG. 2.

In embodiments where the electronic device circuitry 700 is an eNB, a BTS and/or a network node, or is incorporated into or is otherwise part of an eNB, a BTS and/or a network node, the transmit circuitry 710 can transmit a WT Addition Request or a RRCConnectionReconfiguration message as shown in FIG. 2. The receive circuitry 712 can receive a WT Addition Request Acknowledge or a RRCConnectionReconfigurationComplete message as shown in FIG. 2.

Figure 9:
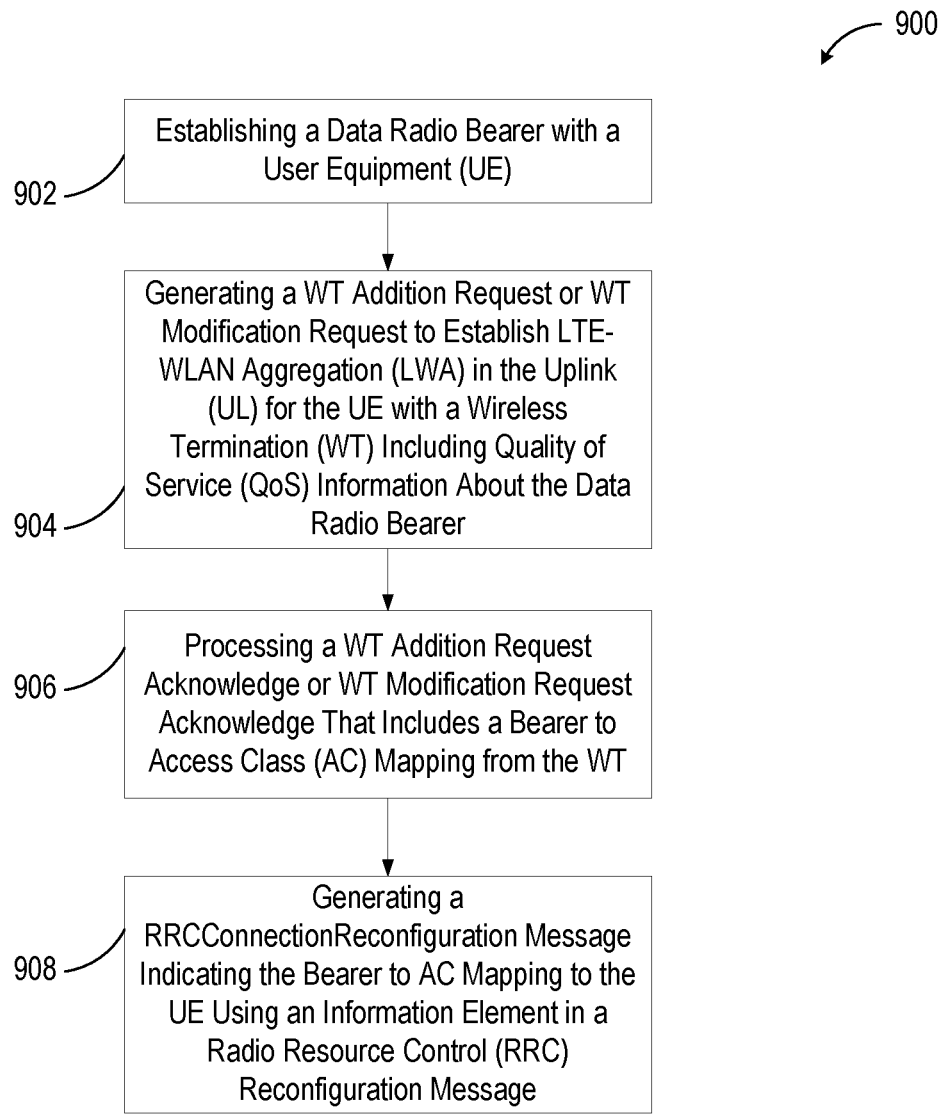
FIG. 9 is a flow chart illustrating a method for mapping an LTE bearer to a WLAN access category (AC) in the uplink (UL), consistent with embodiments disclosed herein.

In certain embodiments, the electronic device circuitry 700 shown in FIG. 7 is operable to perform one or more methods, such as the methods shown in FIG. 9.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
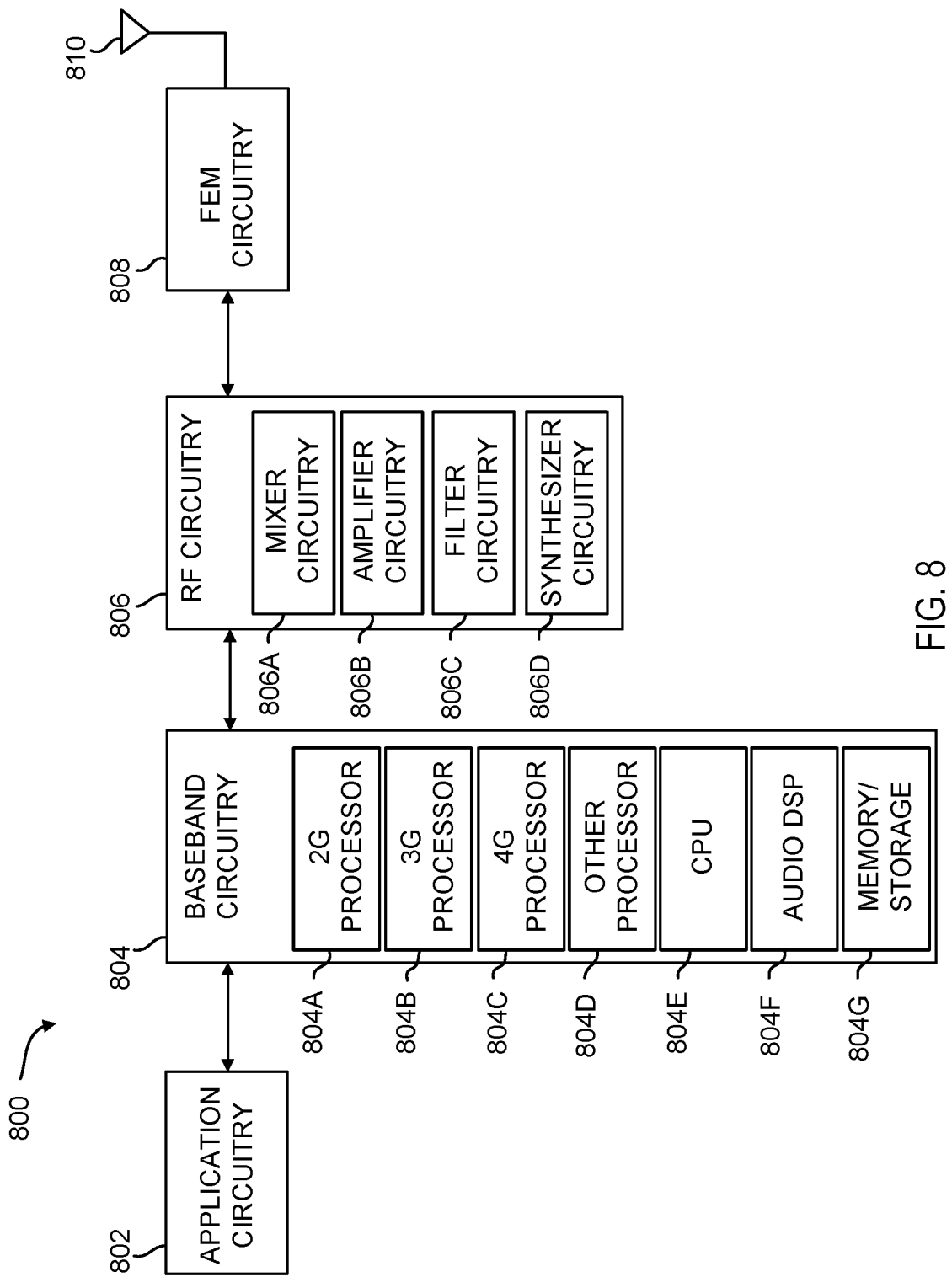
FIG. 8 is a block diagram illustrating example components of a UE or mobile station (MS) device consistent with embodiments disclosed herein.

FIG. 8 is a block diagram illustrating example components of a UE or MS device consistent with embodiments disclosed herein. Embodiments described herein may be implemented into a system using any suitably configured hardware and/or software. In some embodiments, the UE device 800 may include application circuitry 802, baseband circuitry 804, Radio Frequency (RF) circuitry 806, front-end module (FEM) circuitry 808, and one or more antennas 810, coupled together at least as shown in FIG. 8.

The application circuitry 802 may include one or more application processors. By way of non-limiting example, the application circuitry 802 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 804 may include one or more single-core or multi-core processors. The baseband circuitry 804 may include one or more baseband processors and/or control logic. The baseband circuitry 804 may be configured to process baseband signals received from a receive signal path of the RF circuitry 806. The baseband circuitry 804 may also be configured to generate baseband signals for a transmit signal path of the RF circuitry 806. The baseband circuitry 804 may interface with the application circuitry 802 for generation and processing of the baseband signals, and for controlling operations of the RF circuitry 806.

By way of non-limiting example, the baseband circuitry 804 may include at least one of a second generation (2G) baseband processor 804A, a third generation (3G) baseband processor 804B, a fourth generation (4G) baseband processor 804C, other baseband processor(s) 804D for other existing generations, and generations in development or to be developed in the future (e.g., 5G, sixth generation (6G), etc.). The baseband circuitry 804 (e.g., at least one of baseband processors 804A-804D) may handle various radio control functions that enable communication with one or more radio networks via the RF circuitry 806. By way of non-limiting example, the radio control functions may include signal modulation/demodulation, encoding/decoding, radio frequency shifting, other functions, and combinations thereof. In some embodiments, modulation/demodulation circuitry of the baseband circuitry 804 may be programmed to perform Fast-Fourier Transform (FFT), precoding, constellation mapping/demapping functions, other functions, and combinations thereof. In some embodiments, encoding/decoding circuitry of the baseband circuitry 804 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 804 may include elements of a protocol stack. By way of non-limiting example, elements of an n evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804E of the baseband circuitry 804 may be programmed to run elements of the protocol stack for signaling of the PHY, MAC, RLC, PDCP and/or RRC layers. In some embodiments, the baseband circuitry 804 may include one or more audio digital signal processor(s) (DSP) 804F. The audio DSP(s) 804F may include elements for compression/decompression and echo cancellation. The audio DSP(s) 804F may also include other suitable processing elements.

The baseband circuitry 804 may further include memory/storage 804G. The memory/storage 804G may include data and/or instructions for operations performed by the processors of the baseband circuitry 804 stored thereon. In some embodiments, the memory/storage 804G may include any combination of suitable volatile memory and/or non-volatile memory. The memory/storage 804G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 804G may be shared among the various processors or dedicated to particular processors.

Components of the baseband circuitry 804 may be suitably combined in a single chip, a single chipset, or disposed on a same circuit board in some embodiments. In some embodiments, some or all of the constituent components of the baseband circuitry 804 and the application circuitry 802 may be implemented together, such as, for example, on a system on a chip (SOC).

In some embodiments, the baseband circuitry 804 may provide for communication compatible with one or more radio technologies. For example, in some embodiments, the baseband circuitry 804 may support communication with an E-UTRAN and/or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. The RF circuitry 806 may include a receive signal path which may include circuitry to down-convert RF signals received from the FEM circuitry 808, and provide baseband signals to the baseband circuitry 804. The RF circuitry 806 may also include a transmit signal path which may include circuitry to up-convert baseband signals provided by the baseband circuitry 804, and provide RF output signals to the FEM circuitry 808 for transmission.

In some embodiments, the RF circuitry 806 may include a receive signal path and a transmit signal path. The receive signal path of the RF circuitry 806 may include mixer circuitry 806A, amplifier circuitry 806B, and filter circuitry 806C. The transmit signal path of the RF circuitry 806 may include the filter circuitry 806C and the mixer circuitry 806A. The RF circuitry 806 may further include synthesizer circuitry 806D configured to synthesize a frequency for use by the mixer circuitry 806A of the receive signal path and the transmit signal path. In some embodiments, the mixer circuitry 806A of the receive signal path may be configured to down-convert RF signals received from the FEM circuitry 808 based on the synthesized frequency provided by the synthesizer circuitry 806D. The amplifier circuitry 806B may be configured to amplify the down-converted signals.

The filter circuitry 806C may include a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may include zero-frequency baseband signals, although this is not a requirement. In some embodiments, the mixer circuitry 806A of the receive signal path may comprise passive mixers, although the scope of the embodiments is not limited in this respect.

In some embodiments, the mixer circuitry 806A of the transmit signal path may be configured to up-convert input baseband signals based on the synthesized frequency provided by the synthesizer circuitry 806D to generate RF output signals for the FEM circuitry 808. The baseband signals may be provided by the baseband circuitry 804 and may be filtered by the filter circuitry 806C. The filter circuitry 806C may include a low-pass filter (LPF), although the scope of the embodiments is not limited in this respect. In some embodiments, the mixer circuitry 806A of the receive signal path and the mixer circuitry 806A of the transmit signal path may include two or more mixers, and may be arranged for quadrature downconversion and/or upconversion, respectively. In some embodiments, the mixer circuitry 806A of the receive signal path and the mixer circuitry 806A of the transmit signal path may include two or more mixers and may be arranged for image rejection (e.g., Hartley image rejection). In some embodiments, the mixer circuitry 806A of the receive signal path and the mixer circuitry 806A may be arranged for direct downconversion and/or direct upconversion, respectively. In some embodiments, the mixer circuitry 806A of the receive signal path and the mixer circuitry 806A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 806 may include analog-to-digital converter (ADC) and digital-to-analog converter (DAC) circuitry, and the baseband circuitry 804 may include a digital baseband interface to communicate with the RF circuitry 806.

In some dual-mode embodiments, separate radio IC circuitry may be provided for processing signals for each spectrum, although the scope of the embodiments is not limited in this respect.

In some embodiments, the synthesizer circuitry 806D may include one or more of a fractional-N synthesizer and a fractional N/N+1 synthesizer, although the scope of the embodiments is not limited in this respect as other types of frequency synthesizers may be suitable. For example, the synthesizer circuitry 806D may include a delta-sigma synthesizer, a frequency multiplier, a synthesizer comprising a phase-locked loop with a frequency divider, other synthesizers and combinations thereof.

The synthesizer circuitry 806D may be configured to synthesize an output frequency for use by the mixer circuitry 806A of the RF circuitry 806 based on a frequency input and a divider control input. In some embodiments, the synthesizer circuitry 806D may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 depending on the desired output frequency. In some embodiments, a divider control input (e.g., N) may be determined from a look-up table based on a channel indicated by the application circuitry 802.

The synthesizer circuitry 806D of the RF circuitry 806 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements; a phase detector; a charge pump; and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 806D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

The FEM circuitry 808 may include a receive signal path which may include circuitry configured to operate on RF signals received from one or more antennas 810, amplify the received signals, and provide the amplified versions of the received signals to the RF circuitry 806 for further processing. The FEM circuitry 808 may also include a transmit signal path which may include circuitry configured to amplify signals for transmission provided by the RF circuitry 806 for transmission by at least one of the one or more antennas 810.

In some embodiments, the FEM circuitry 808 may include a TX/RX switch configured to switch between a transmit mode and a receive mode operation. The FEM circuitry 808 may include a receive signal path and a transmit signal path. The receive signal path of the FEM circuitry 808 may include a low-noise amplifier (LNA) to amplify received RF signals and provide the amplified received RF signals as an output (e.g., to the RF circuitry 806). The transmit signal path of the FEM circuitry 808 may include a power amplifier (PA) configured to amplify input RF signals (e.g., provided by the RF circuitry 806), and one or more filters configured to generate RF signals for subsequent transmission (e.g., by one or more of the one or more antennas 810).

In some embodiments, the MS device 800 may include additional elements such as, for example, memory/storage, a display, a camera, one of more sensors, an input/output (I/O) interface, other elements, and combinations thereof.

In some embodiments, the MS device 800 may be configured to perform one or more processes, techniques, and/or methods as described herein, or portions thereof.

FIG. 9 is a flow chart illustrating a method for mapping an LTE bearer to a WLAN AC in the UL. The method can be accomplished by the systems shown in FIG. 1 including the eNB 104, WT/AC 106 and the UE 102. In block 902, an eNB establishes a data radio bearer with a user equipment (UE). In block 904, an eNB generates a WT Addition Request or WT Modification Request to establish LTE-WLAN aggregation (LWA) in the uplink (UL) for the UE with a Wireless Termination (WT) including quality of service (QoS) information about the data radio bearer. In block 906, the eNB processes a WT Addition Request Acknowledge or WT Modification Request Acknowledge that includes a bearer to AC mapping from the WT. In block 908, the eNB generates a RRCConnectionReconfiguration message indicating the bearer to AC mapping to the UE using an information element in a radio resource control (RRC) Reconfiguration message.

Figure 10:
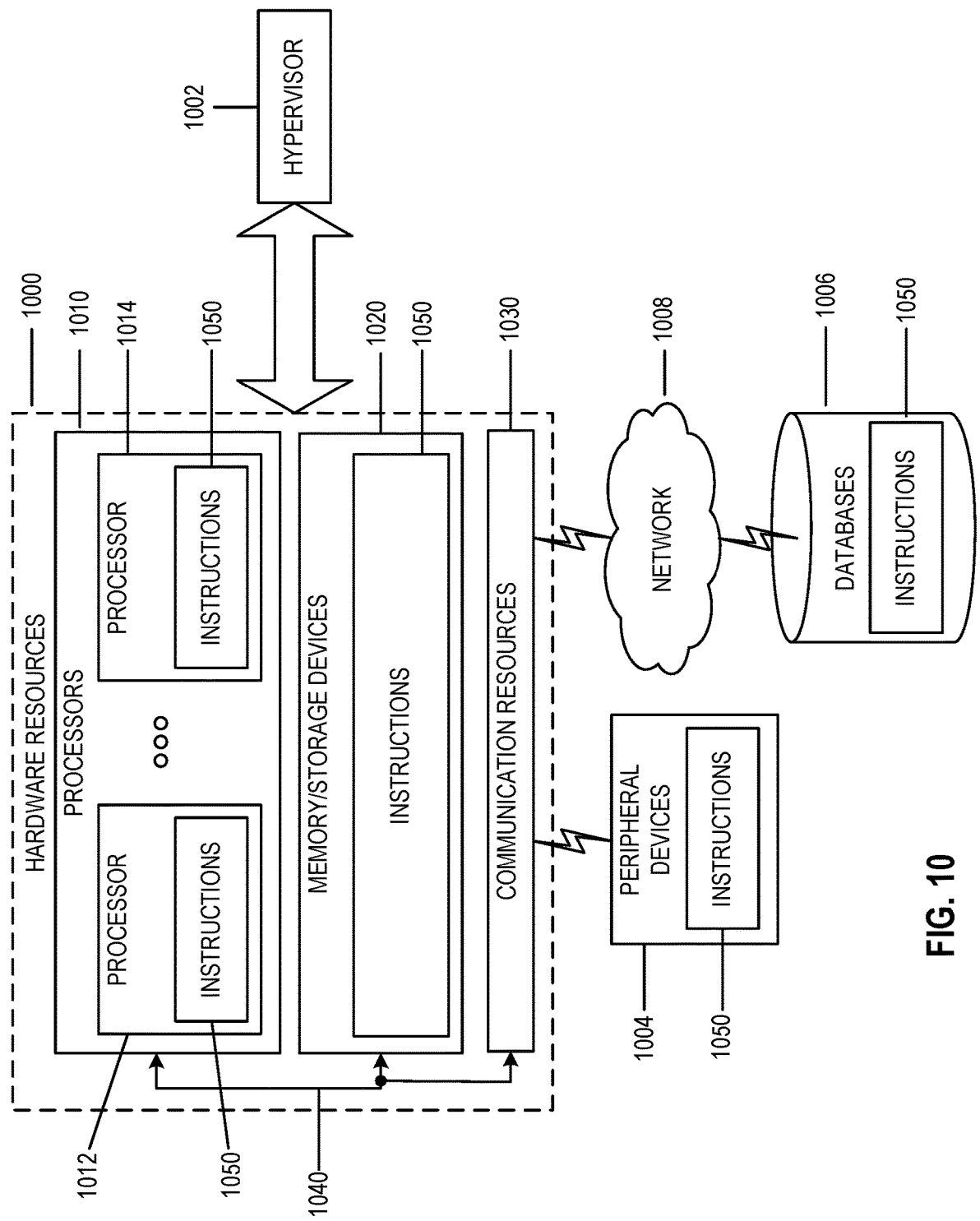
FIG. 10 is a block diagram illustrating components, according to some example embodiments, able to read instructions from a machine-readable or computer-readable medium (e.g., a machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Figure 11:
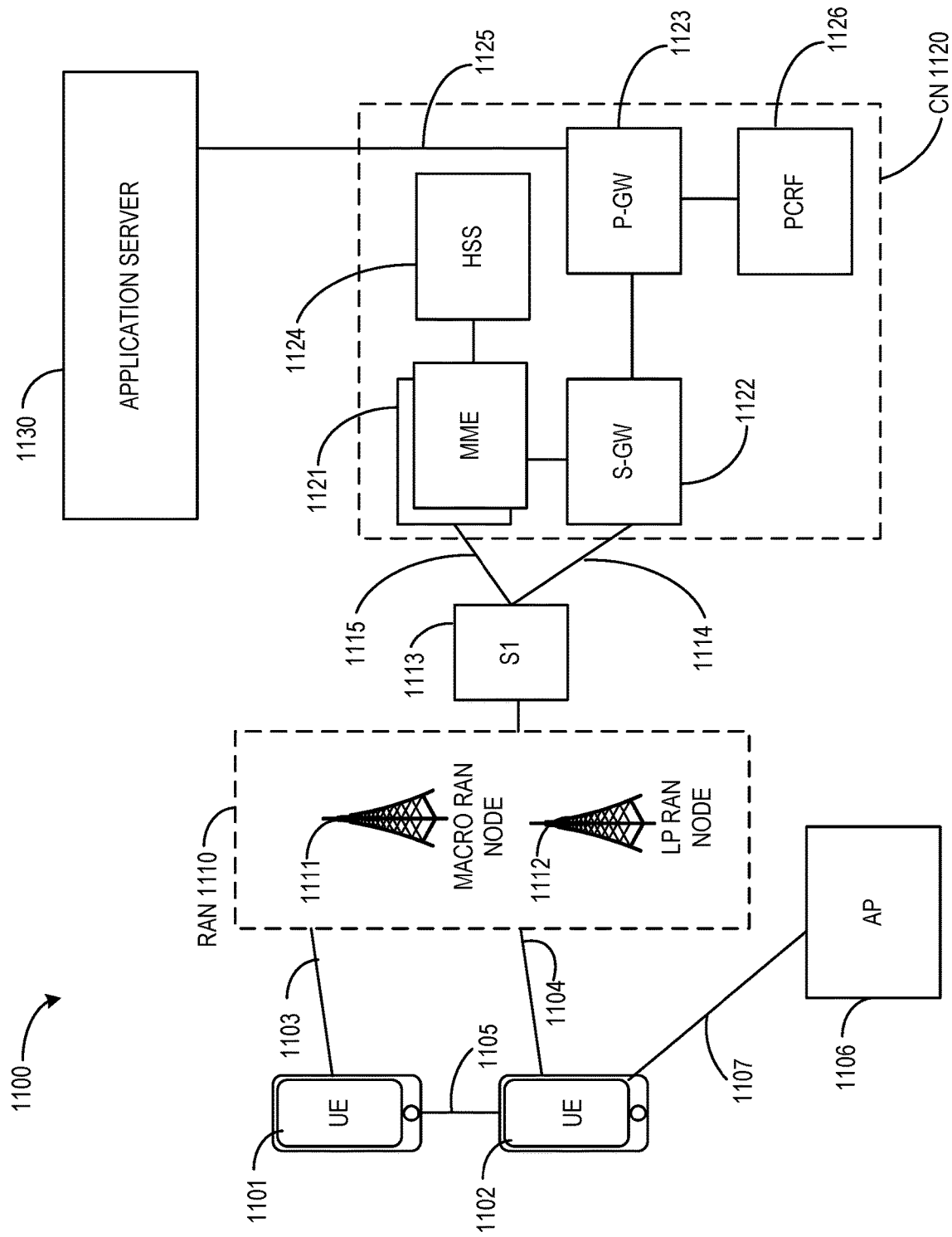
FIG. 11 illustrates an architecture of a system of a network in accordance with some embodiments disclosed herein.

FIG. 11 illustrates an architecture of a system 1100 of a network in accordance with some embodiments. The system 1100 is shown to include a user equipment (UE) 1101 and a UE 1102. The UEs 1101 and 1102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1101 and 1102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 and 1102 may be configured to connect, e.g., communicatively couple, with a radio access network (RAN) 1110. The RAN 1110 may be, for example, an Evolved Universal Mobile Telecommunications System (UMTS) Terrestrial Radio Access Network (E-UTRAN), a NextGen RAN (NG RAN), or some other type of RAN. The UEs 1101 and 1102 utilize connections 1103 and 1104, respectively, each of which comprises a physical communications interface or layer (discussed in further detail below); in this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface comprising one or more logical channels, including, but not limited to, a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 can comprise a local wireless connection, such as a connection consistent with any IEEE 802.11 protocol, wherein the AP 1106 would comprise a wireless fidelity (WiFi®) router. In this example, the AP 1106 is shown to be connected to the Internet without connecting to the core network of the wireless system (described in further detail below).

The RAN 1110 can include one or more access nodes that enable the connections 1103 and 1104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 1110 is shown to be communicatively coupled to a core network (CN) 1120—via an S1 interface 1113. In embodiments, the CN 1120 may be an evolved packet core (EPC) network, a NextGen Packet Core (NPC) network, or some other type of CN. In this embodiment the S1 interface 1113 is split into two parts: the S1-U interface 1114, which carries traffic data between the RAN nodes 1111 and 1112 and a serving gateway (S-GW) 1122, and an S1-mobility management entity (MME) interface 1115, which is a signaling interface between the RAN nodes 1111 and 1112 and MMES 1121.

In this embodiment, the CN 1120 comprises the MMEs 1121, the S-GW 1122, a Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN). The MMEs 1121 may manage mobility aspects in access such as gateway selection and tracking area list management. The HSS 1124 may comprise a database for network users, including subscription-related information to support the network entities' handling of communication sessions. The CN 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 may terminate the S1 interface 1113 towards the RAN 1110, and routes data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 may terminate an SGi interface toward a PDN. The P-GW 1123 may route data packets between the EPC network (such as P-GW 1123) and external networks such as a network including an application server 1130 (alternatively referred to as application function (AF)) via an Internet Protocol (IP) interface 1125. Generally, the application server 1130 may be an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

The P-GW 1123 may further be a node for policy enforcement and charging data collection. A Policy and Charging Enforcement Function (PCRF) 1126 is the policy and charging control element of the CN 1120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server 1130.

Figure 12:
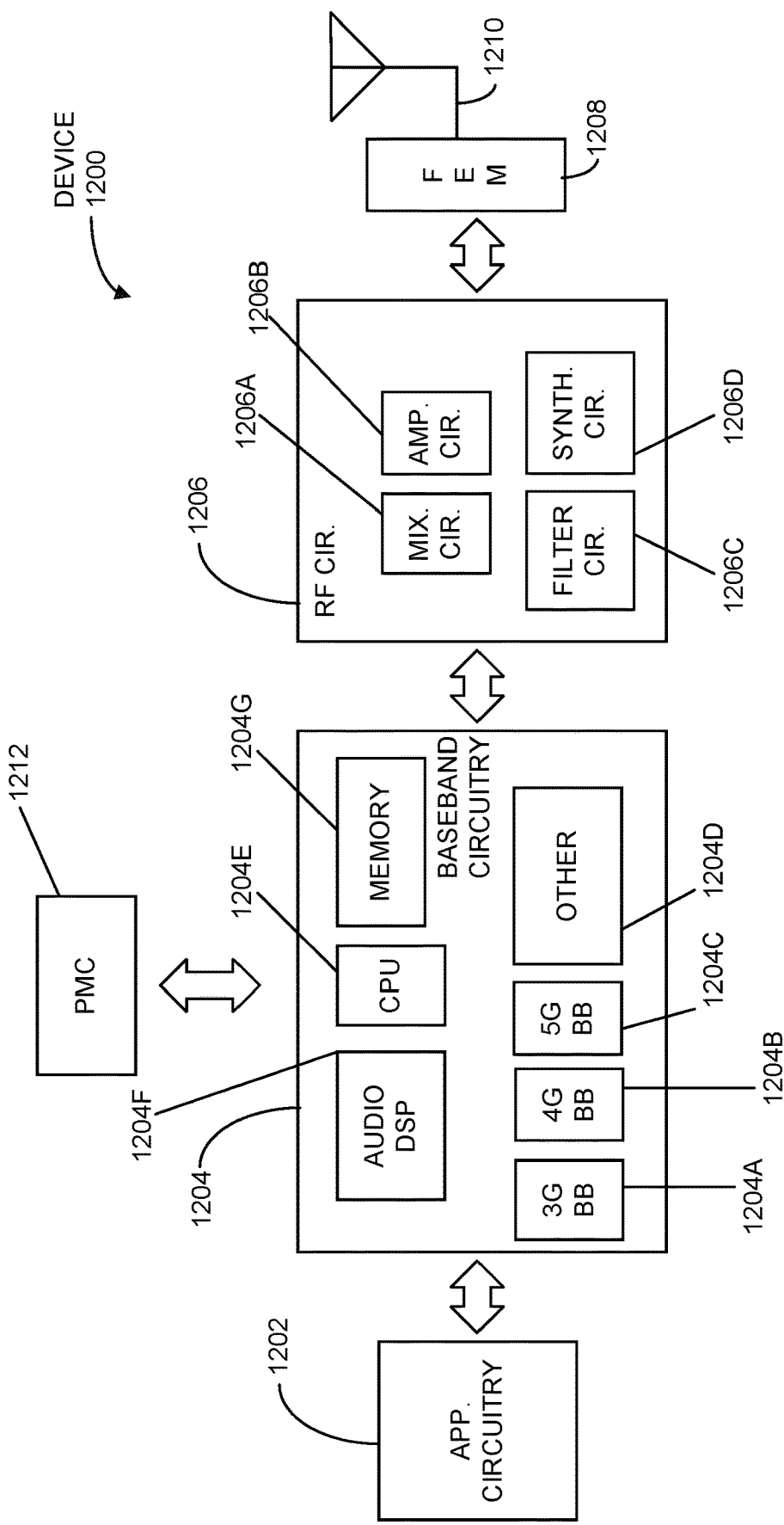
FIG. 12 illustrates example components of a device in accordance with some embodiments disclosed herein.

FIG. 12 illustrates example components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include fewer elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. The baseband circuitry 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) may handle various radio control functions that enable communication with one or more radio networks via the RF circuitry 1206. In other embodiments, some or all of the functionality of baseband processors 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204F. The audio DSP(s) 1204F may be include elements for compression/decompression and echo cancellation and may include other suitable processing elements in other embodiments. Components of the baseband circuitry may be suitably combined in a single chip or a single chipset, or disposed on a same circuit board in some embodiments. In some embodiments, some or all of the constituent components of the baseband circuitry 1204 and the application circuitry 1202 may be implemented together such as, for example, on an system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1204 is configured to support radio communications of more than one wireless protocol may be referred to as multi-mode baseband circuitry.

The RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. The RF circuitry 1206 may include a receive signal path which may include circuitry to down-convert RF signals received from the FEM circuitry 1208 and provide baseband signals to the baseband circuitry 1204. The RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206A, amplifier circuitry 1206B and filter circuitry 1206C. In some embodiments, the transmit signal path of the RF circuitry 1206 may include the filter circuitry 1206C and the mixer circuitry 1206A. The RF circuitry 1206 may also include synthesizer circuitry 1206D for synthesizing a frequency for use by the mixer circuitry 1206A of the receive signal path and the transmit signal path. In some embodiments, the mixer circuitry 1206A of the receive signal path may be configured to down-convert RF signals received from the FEM circuitry 1208 based on the synthesized frequency provided by the synthesizer circuitry 1206D. The amplifier circuitry 1206B may be configured to amplify the down-converted signals and the filter circuitry 1206C may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, the mixer circuitry 1206A of the receive signal path may comprise passive mixers, although the scope of the embodiments is not limited in this respect.

In some embodiments, the mixer circuitry 1206A of the transmit signal path may be configured to up-convert input baseband signals based on the synthesized frequency provided by the synthesizer circuitry 1206D to generate RF output signals for the FEM circuitry 1208. The baseband signals may be provided by the baseband circuitry 1204 and may be filtered by the filter circuitry 1206C.

In some embodiments, the mixer circuitry 1206A of the receive signal path and the mixer circuitry 1206A of the transmit signal path may include two or more mixers and may be arranged for quadrature downconversion and upconversion, respectively. In some embodiments, the mixer circuitry 1206A of the receive signal path and the mixer circuitry 1206A of the transmit signal path may include two or more mixers and may be arranged for image rejection (e.g., Hartley image rejection). In some embodiments, the mixer circuitry 1206A of the receive signal path and the mixer circuitry 1206A may be arranged for direct downconversion and direct upconversion, respectively. In some embodiments, the mixer circuitry 1206A of the receive signal path and the mixer circuitry 1206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206D may be a fractional-N synthesizer or a fractional N/N+1 synthesizer, although the scope of the embodiments is not limited in this respect as other types of frequency synthesizers may be suitable. For example, synthesizer circuitry 1206D may be a delta-sigma synthesizer, a frequency multiplier, or a synthesizer comprising a phase-locked loop with a frequency divider.

The synthesizer circuitry 1206D may be configured to synthesize an output frequency for use by the mixer circuitry 1206A of the RF circuitry 1206 based on a frequency input and a divider control input. In some embodiments, the synthesizer circuitry 1206D may be a fractional N/N+1 synthesizer.

In some embodiments, frequency input may be provided by a voltage controlled oscillator (VCO), although that is not a requirement. Divider control input may be provided by either the baseband circuitry 1204 or the application circuitry 1202 depending on the desired output frequency. In some embodiments, a divider control input (e.g., N) may be determined from a look-up table based on a channel indicated by the application circuitry 1202.

The synthesizer circuitry 1206D of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements; a phase detector; a charge pump; and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

The FEM circuitry 1208 may include a receive signal path which may include circuitry configured to operate on RF signals received from one or more antennas 1210, amplify the received signals and provide the amplified versions of the received signals to the RF circuitry 1206 for further processing. The FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM circuitry 1208, or in both the RF circuitry 1206 and the FEM circuitry 1208.

In some embodiments, the FEM circuitry 1208 may include a TX/RX switch to switch between transmit mode and receive mode operation. The FEM circuitry 1208 may include a receive signal path and a transmit signal path. The receive signal path of the FEM circuitry 1208 may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by the RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device 1200 is included in a UE. The PMC 1212 may increase the power conversion efficiency while providing desirable implementation size and heat dissipation characteristics.

FIG. 12 shows the PMC 1212 coupled with the baseband circuitry 1204. However, in other embodiments, the PMC 1212 may be additionally or alternatively coupled with, and perform similar power management operations for, other components such as, but not limited to, the application circuitry 1202, the RF circuitry 1206, or the FEM circuitry 1208.

In some embodiments, the PMC 1212 may control, or otherwise be part of, various power saving mechanisms of the device 1200. For example, if the device 1200 is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state, and it performs paging where again it periodically wakes up to listen to the network and then powers down again. The device 1200 may not receive data in this state; in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used to execute Layer 3, Layer 2, or Layer 1 functionality, while processors of the application circuitry 1202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
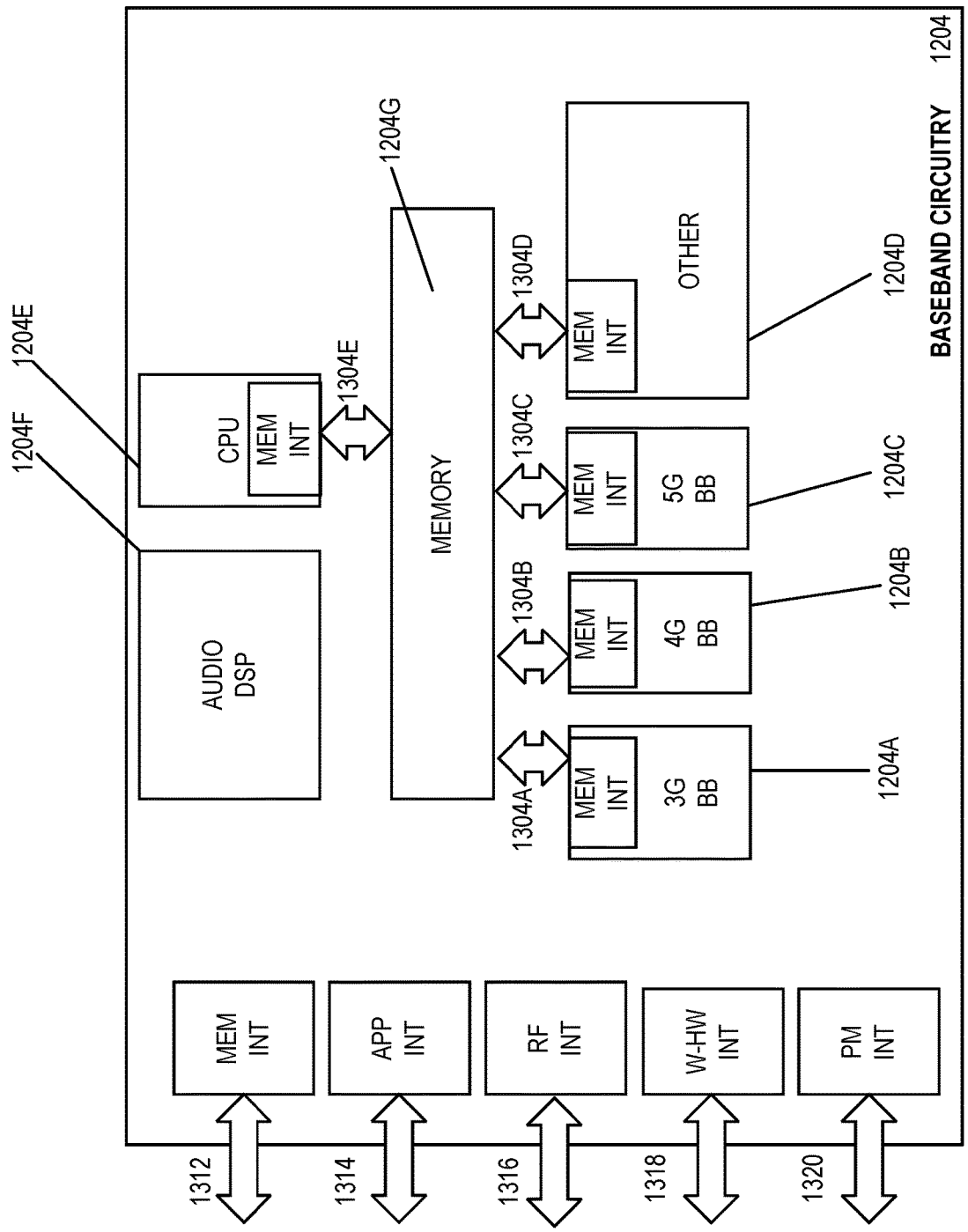
FIG. 13 illustrates example interfaces of baseband circuitry in accordance with some embodiments disclosed herein.

FIG. 13 illustrates example interfaces of baseband circuitry in accordance with some embodiments. As discussed above, the baseband circuitry 1204 of FIG. 12 may comprise processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212).

Figure 14:
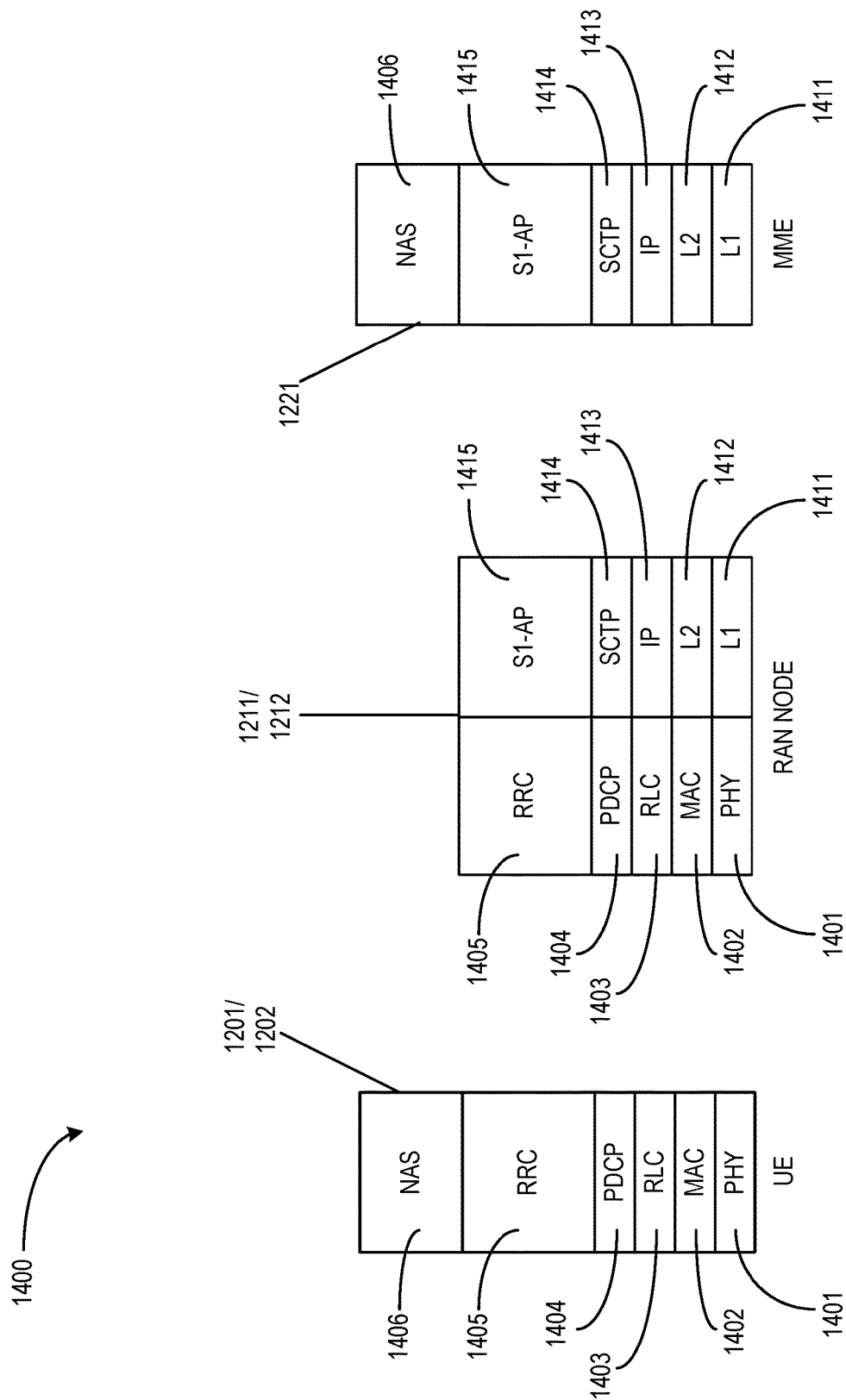
FIG. 14 illustrates a control plane protocol stack in accordance with some embodiments disclosed herein.

FIG. 14 is an illustration of a control plane protocol stack in accordance with some embodiments. In this embodiment, a control plane 1400 is shown as a communications protocol stack between the UE 1101 (or alternatively, the UE 1102), the RAN node 1111 (or alternatively, the RAN node 1112), and the MME 1121.

A PHY layer 1401 may transmit or receive information used by a MAC layer 1402 over one or more air interfaces. The PHY layer 1401 may further perform link adaptation or adaptive modulation and coding (AMC), power control, cell search (e.g., for initial synchronization and handover purposes), and other measurements used by higher layers, such as an RRC layer 1405. The PHY layer 1401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1402 may perform mapping between logical channels and transport channels, multiplexing of MAC service data units (SDUs) from one or more logical channels onto transport blocks (TBs) to be delivered to PHY via transport channels, de-multiplexing MAC SDUs to one or more logical channels from transport blocks (TBs) delivered from the PHY via transport channels, multiplexing MAC SDUs onto TBs, scheduling information reporting, error correction through hybrid automatic repeat request (HARD), and logical channel prioritization.

An RLC layer 1403 may operate in a plurality of modes of operation, including: Transparent Mode (TM), Unacknowledged Mode (UM), and Acknowledged Mode (AM). The RLC layer 1403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 1404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1101 and the RAN node 1111 may utilize a Uu interface (e.g., an LTE-Uu interface) to exchange control plane data via a protocol stack comprising the PHY layer 1401, the MAC layer 1402, the RLC layer 1403, the PDCP layer 1404, and the RRC layer 1405.

In the embodiment shown, the non-access stratum (NAS) protocols 1406 form the highest stratum of the control plane between the UE 1101 and the MME 1121. The NAS protocols 1406 support the mobility of the UE 1101 and the session management procedures to establish and maintain IP connectivity between the UE 1101 and the P-GW 1123.

An S1 Application Protocol (S1-AP) layer 1415 may support the functions of the S1 interface and comprise Elementary Procedures (EPs). An EP is a unit of interaction between the RAN node 1111 and the CN 1120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) 1414 may ensure reliable delivery of signaling messages between the RAN node 1111 and the MME 1121 based, in part, on the IP protocol, supported by an IP layer 1413. An L2 layer 1412 and an L1 layer 1411 may refer to communication links (e.g., wired or wireless) used by the RAN node and the MME to exchange information.

The RAN node 1111 and the MME 1121 may utilize an S1-MME interface to exchange control plane data via a protocol stack comprising the L1 layer 1411, the L2 layer 1412, the IP layer 1413, the SCTP layer 1414, and the S1-AP layer 1415.

Figure 15:
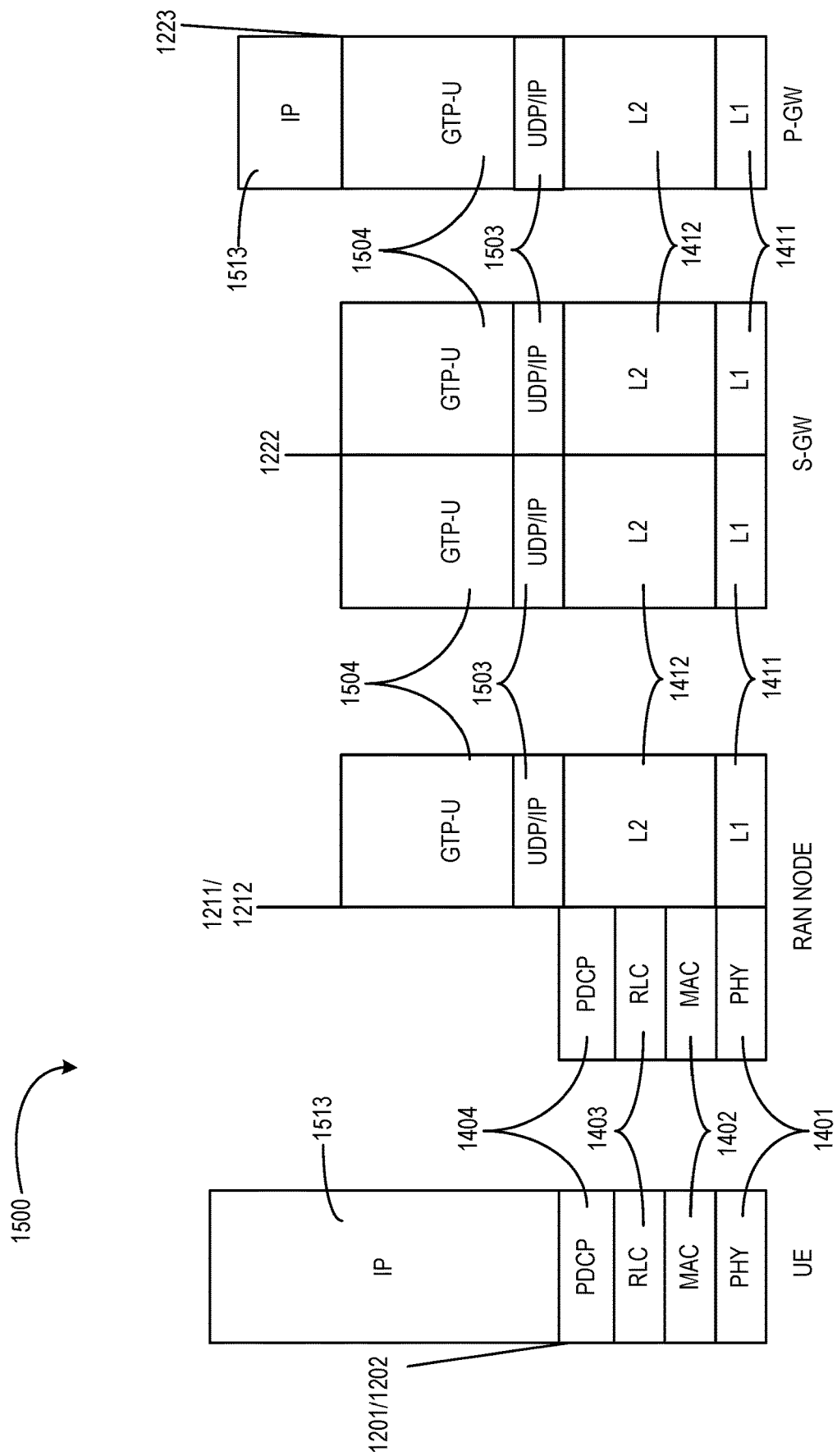
FIG. 15 illustrates a user plane protocol stack in accordance with some embodiments.

FIG. 15 is an illustration of a user plane protocol stack in accordance with some embodiments. In this embodiment, a user plane 1500 is shown as a communications protocol stack between the UE 1101 (or alternatively, the UE 1102), the RAN node 1111 (or alternatively, the RAN node 1112), the S-GW 1122, and the P-GW 1123. The user plane 1500 may utilize at least some of the same protocol layers as the control plane 1400. For example, the UE 1101 and the RAN node 1111 may utilize a Uu interface (e.g., an LTE-Uu interface) to exchange user plane data via a protocol stack comprising the PHY layer 1401, the MAC layer 1402, the RLC layer 1403, the PDCP layer 1404.

The General Packet Radio Service (GPRS) Tunneling Protocol for the user plane (GTP-U) layer 1504 may be used for carrying user data within the GPRS core network and between the radio access network and the core network. The user data transported can be packets in any of IPv4, IPv6, or PPP formats, for example. The UDP and IP security (UDP/IP) layer 1503 may provide checksums for data integrity, port numbers for addressing different functions at the source and destination, and encryption and authentication on the selected data flows. The RAN node 1111 and the S-GW 1122 may utilize an S1-U interface to exchange user plane data via a protocol stack comprising the L1 layer 1411, the L2 layer 1412, the UDP/IP layer 1503, and the GTP-U layer 1504. The S-GW 1122 and the P-GW 1123 may utilize an S5/S8a interface to exchange user plane data via a protocol stack comprising the L1 layer 1411, the L2 layer 1412, the UDP/IP layer 1503, and the GTP-U layer 1504. As discussed above with respect to FIG. 14, NAS protocols support the mobility of the UE 1101 and the session management procedures to establish and maintain IP connectivity between the UE 1101 and the P-GW 1123.

EXAMPLES

The following examples pertain to further embodiments.

Example 1 is a radio access network (RAN) node for mapping a long term evolution (LTE) bearer to a wireless local area network (WLAN) access category (AC) in the uplink (UL): a long term evolution (LTE) interface coupled to a user equipment (UE) using LTE and supporting a quality of service (QoS), a Xw interface coupled to a wireless termination (WT) that is coupled to the UE using WLAN. The RAN node also includes a processor designed to create an LTE bearer, perform LTE-WLAN aggregation (LWA) in the UL with the LTE interface and the Xw interface, process a mapping from the WT indicating a WLAN AC to associate with the LTE bearer, and generate a message, indicating the mapping of the AC to the LTE bearer, to transmit to the UE using radio resource control signaling.

Example 2 is the RAN node of Example 1, where to perform LWA in the UL further includes to generate a WT Modification Request for transmission to the WT that includes an information element that identifies the LTE bearer.

Example 3 is the RAN node of Example 1 where to perform LWA in the UL further includes to generate a WT Addition Request for transmission to the WT that includes an information element that identifies the LTE bearer.

Example 4 is the RAN node of Example 1, where to generate the message indicating the mapping further includes to generate a radio resource reconfiguration message to the UE that includes an information element indicating the mapping of the LTE bearer to the AC mapping.

Example 5 is the RAN node of any of Examples 1-4, where the processing unit is further designed to: create a new LTE bearer with a new LTE QoS, generate a WT Modification request message with an information element that indicates the new bearer to the WT, process a new mapping from the WT indicating a new WLAN AC to associate with the new LTE bearer, and generate a new message, indicating the mapping of the new LTE bearer to the new WLAN AC, to transmit to the UE using radio resource control signaling.

Example 6 is the RAN node of any of Examples 1-4, where the processor is a baseband processor.

Example 7 is circuitry of a radio access network (RAN) node. The circuitry of a radio access network (RAN) node includes storage for a mapping of a radio bearer to a wireless local area network (WLAN) access category (AC). The circuitry of a radio access network (RAN) node further includes a baseband processor, the processor designed to: construct a radio bearer for use with a user equipment (UE), generate a WLAN aggregation message to a wireless termination (WT) of the radio bearer for use in WLAN aggregation with the WT, process a confirmation message that includes the mapping of the radio bearer to the WLAN AC, and generate a UE message to the UE indicating the mapping of the radio bearer to the WLAN AC.

Example 8 is the circuitry of Example 7, where the confirmation message is a WT Addition Request Acknowledge with an information element identifying the mapping of the AC to the radio bearer.

Example 9 is the circuitry of Example 8, where the information element includes an lwa-WLAN-AC field that indicates the mapping of the AC to the radio bearer.

Example 10 is the circuitry of Example 7, where the confirmation message is a WT Modification Request Acknowledge with an information element identifying the mapping of the AC to radio bearer.

Example 11 is the circuitry of any of Examples 7-10, where to generate the UE message further includes generating a RRCConnectionReconfiguration message that includes an information element identifying the mapping of the AC to radio bearer.

Example 12 is a computer program product including a computer-readable storage medium that stores instructions for execution by a processor to perform operations of a radio access network (RAN) node, the operations, when executed by the processor, to perform a method. The method includes establishing a data radio bearer with a user equipment (UE), and generating a WT Addition Request or WT Modification Request to establish LTE-WLAN aggregation (LWA) in the uplink (UL) for the UE with a wireless termination (WT) including quality of service (QoS) information about the data radio bearer. The method includes processing a WT Addition Request Acknowledge or WT Modification Request Acknowledge that includes a bearer to access class (AC) mapping from the WT, and generating a RRCConnectionReconfiguration message indicating the bearer to AC mapping to the UE using an information element in a radio resource control (RRC) reconfiguration message.

Example 13 is the computer program product of Example 12. The method further includes processing a RRCConnectionReconfigurationComplete message from the UE.

Example 14 is the computer program product of Example 13. The method further includes processing UE UL data traffic from an LTE interface and an Xw interface, and generating, using the UE UL data traffic, evolved packet system (EPS) bearer traffic that corresponds with the data radio bearer based at least in part on the bearer to AC mapping from the WT.

Example 15 is the computer program product of Example 13. The method further includes processing a WT Association Confirmation from the WT using a Xw interface.

Example 16 is the computer program product of Example 15. The method further includes processing a WLANConnectionStatusReport from the UE using a cellular interface.

Example 17 is the computer program product of Example 12. The method further includes processing data from the UE in the UL received from the WT using a Xw interface, and generating, using the data, a packet of an evolved packet system (EPS) bearer that corresponds with the data radio bearer based at least in part on the bearer to access class (AC) mapping from the WT.

Example 18 is the computer program product of Example 12, where the data radio bearer is a dedicated bearer.

Example 19 is the computer program product of Example 12, where the data radio bearer is a default bearer.

Example 20 is the computer program product of Example 12. The method further includes establishing an additional data radio bearer with the UE, and generating a new WT Modification Request to establish LWA in the UL for the UE with the wireless termination (WT) using the additional data radio bearer. The method further includes processing a new WT Modification Request Acknowledge that includes an additional bearer to access class (AC) mapping from the WT, and generating a new RRCConnectionReconfiguration message indicating the additional bearer to AC mapping to the UE using the information element in the RRC reconfiguration message.

Example 21 is an apparatus for mapping a long term evolution (LTE) bearer to a wireless local area network (WLAN) access category (AC) in the uplink (UL). The apparatus includes a manner for establishing a data radio bearer with a user equipment (UE), and a manner for generating a WT Addition Request or WT Modification Request to establish LTE-WLAN aggregation (LWA) in the uplink (UL) for the UE with a wireless termination (WT) including quality of service (QoS) information about the data radio bearer. The apparatus includes a manner for processing a WT Addition Request Acknowledge or WT Modification Request Acknowledge that includes a bearer to access class (AC) mapping from the WT, and a manner for generating a RRCConnectionReconfiguration message indicating the bearer to AC mapping to the UE using an information element in a radio resource control (RRC) reconfiguration message.

Example 22 is a method of mapping a long term evolution (LTE) bearer to a wireless local area network (WLAN) access category (AC) in the uplink (UL). The method includes establishing a data radio bearer with a user equipment (UE), and generating a WT Addition Request or WT Modification Request to establish LTE-WLAN aggregation (LWA) in the uplink (UL) for the UE with a wireless termination (WT) including quality of service (QoS) information about the data radio bearer. The method includes processing a WT Addition Request Acknowledge or WT Modification Request Acknowledge that includes a bearer to access class (AC) mapping from the WT, and generating a RRCConnectionReconfiguration message indicating the bearer to AC mapping to the UE using an information element in a radio resource control (RRC) reconfiguration message.

Example 23 is the method of Example 22. The method further includes processing a RRCConnectionReconfigurationComplete message from the UE.

Example 24 is the method of Example 23. The method further includes processing UE UL data traffic from an LTE interface and an Xw interface, and generating, using the UE UL data traffic, evolved packet system (EPS) bearer traffic that corresponds with the data radio bearer based at least in part on the bearer to access class (AC) mapping from the WT.

Example 25 is the method of Example 23. The method further includes processing a WT Association Confirmation from the WT using a Xw interface.

Example 26. The method of Example 25. The method further includes processing a WLANConnectionStatusReport from the UE using a cellular interface.

Example 27 is the method of Example 22. The method further includes processing data from the UE in the UL received from the WT using a Xw interface, and generating, using the data, a packet of an evolved packet system (EPS) bearer that corresponds with the data radio bearer based at least in part on the bearer to access class (AC) mapping from the WT.

Example 28 is the method of Example 22, where the data radio bearer is a dedicated bearer.

Example 29 is the method of Example 22, where the data radio bearer is a default bearer.

Example 30 is the method of Example 22. The method further includes establishing an additional data radio bearer with the UE, and generating a new WT Modification Request to establish LWA in the UL for the UE with the wireless termination (WT) using the additional data radio bearer. The method further includes processing a new WT Modification Request Acknowledge that includes an additional bearer to access class (AC) mapping from the WT, and generating a new RRCConnectionReconfiguration message indicating the additional bearer to AC mapping to the UE using the information element in the RRC reconfiguration message.

Example 31 is an apparatus comprising means to perform a method as exemplified in any of Examples 22-30.

Example 32 is a machine-readable storage including machine-readable instructions, when executed, to implement a method or realize an apparatus as exemplified in any of Examples 22-30.

Example 33 is a machine readable medium including code, when executed, to cause a machine to perform the method of any one of Examples 22-30.

ADDITIONAL EXAMPLES

Additional Example 1 is an Evolved Node B (eNB) comprising an LTE interface, an Xw interface, and a QoS configuration mapping module.

Additional Example 2 is the eNB of Additional Example 1 configured to receive the LTE QoS to WLAN QoS mapping and to communicate the said mapping to the UE via the said LTE interface.

Additional Example 3 is the eNB of Additional Example 2, configured to receive the LTE QCI to WLAN AC mapping and further configured to translate the said mapping into the DRB ID to WLAN AC mapping.

Additional Example 4 is the eNB of Additional Example 2, configured to receive the DRB ID to WLAN AC mapping.

Additional Example 5 is the eNB of Additional Example 3, configured to receive the said mapping from OAM.

Additional Example 6 is the eNB of Additional Example 3, configured to receive the said mapping from the WT via WT Configuration Update Xw-AP message or Xw Setup Response Xw-AP message.

Additional Example 7 is the eNB of Additional Example 4, configured to receive the said mapping from the WT via the WT Addition Request Acknowledge message or WT Modification Request Acknowledge message.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables; telephone lines; radio waves; satellites; microwave relays; modulated AC power lines; physical media transfer; and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a random access memory (RAM), an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/aspects/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skill in the art will appreciate that many changes may be made to the details of the above-described embodiments without departing from the underlying principles. The scope of the present embodiments should, therefore, be determined only by the following claims.

The invention claimed is:

1. A radio access network (RAN) node for mapping a long term evolution (LTE) bearer to a wireless local area network (WLAN) access category (AC) in an uplink (UL):
a LTE interface coupled to a user equipment (UE) using LTE and supporting a quality of service (QoS);
an Xw interface coupled to a wireless termination (WT) that is coupled to the UE using WLAN; and
a processor configured to:
create the LTE bearer;
perform LTE-WLAN aggregation (LWA) in the UL with the LTE interface and the Xw interface;
process a mapping indicated by an lwa-WLAN-AC field of an information element of a WT Addition Request Acknowledge from the WT, the mapping associating the WLAN AC to the LTE bearer; and
generate a message, indicating the mapping of the WLAN AC to the LTE bearer, to transmit to the UE using radio resource control signaling.

2. The RAN node of claim 1, wherein to perform LWA in the UL further comprises to generate a WT Modification Request for transmission to the WT that includes an information element that identifies the LTE bearer.

3. The RAN node of claim 1 wherein to perform LWA in the UL further comprises to generate a WT Addition Request for transmission to the WT that includes an information element that identifies the LTE bearer.

4. The RAN node of claim 1, wherein to generate the message indicating the mapping further comprises to generate a radio resource reconfiguration message to the UE that includes an information element indicating the mapping of the WLAN AC to the LTE bearer.

5. The RAN node of claim 1, wherein the processor is further configured to:
create a new LTE bearer with a new LTE QoS;
generate a WT Modification request message with an information element that indicates the new bearer to the WT;
process a new mapping from the WT indicating a new WLAN AC to associate with the new LTE bearer; and
generate a new message, indicating the mapping of the new LTE bearer to the new WLAN AC, to transmit to the UE using radio resource control signaling.

6. The RAN node of claim 1, wherein the processor is a baseband processor.

7. Circuitry of a radio access network (RAN) node, comprising:
storage for a mapping of a radio bearer to a wireless local area network (WLAN) access category (AC); and
a baseband processor, the processor configured to:
construct a radio bearer for use with a user equipment (UE);
generate a WLAN aggregation message to a wireless termination (WT) of the radio bearer for use in WLAN aggregation with the WT;
process a confirmation message that includes the mapping of the WLAN AC to the radio bearer; wherein the confirmation message is a WT Addition Request Acknowledge with an information element comprising an lwa-WLAN-AC field that indicates the mapping of the WLAN AC to the radio bearer; and
generate a UE message to the UE indicating the mapping of the WLAN AC to the radio bearer.

8. The circuitry of claim 7, wherein to generate the UE message further comprises generating a RRCConnectionReconfiguration message that includes an information element identifying the mapping of the WLAN AC to the radio bearer.

9. A computer program product comprising a computer-readable storage medium that stores instructions for execution by a processor to perform operations of a radio access network (RAN) node, the operations, when executed by the processor, to perform a method, the method comprising:
establishing a data radio bearer with a user equipment (UE);
generating a wireless termination (WT) Addition Request or WT Modification Request to establish long-term evolution (LTE)-wireless local area network (WLAN) aggregation (LWA) in an uplink (UL) for the UE with a WT including quality of service (QoS) information about the data radio bearer;
processing a WT Addition Request Acknowledge or WT Modification Request Acknowledge that includes a bearer to access category (AC) mapping between the data radio bearer and a WLAN AC from the WT, wherein the WT Addition Request Acknowledge or WT Modification Request Acknowledge comprises an information element comprising an lwa-WLAN-AC field that indicates the bearer to AC mapping; and
generating a RRCConnectionReconfiguration message indicating the bearer to AC mapping to the UE using an information element in a radio resource control (RRC) reconfiguration message.

10. The computer program product of claim 9, the method further comprising:
processing a RRCConnectionReconfigurationComplete message from the UE.

11. The computer program product of claim 10, the method further comprising:
processing UE UL data traffic from an LTE interface and an Xw interface; and
generating, using the UE UL data traffic, evolved packet system (EPS) bearer traffic that corresponds with the data radio bearer based at least in part on the bearer to AC mapping from the WT.

12. The computer program product of claim 10, the method further comprising:
processing a WT Association Confirmation from the WT using an Xw interface.

13. The computer program product of claim 12, the method further comprising:
processing a WLANConnectionStatusReport from the UE using a cellular interface.

14. The computer program product of claim 9, the method further comprising:
processing data from the UE in the UL received from the WT using an Xw interface;

generating, using the data, a packet of an evolved packet system (EPS) bearer that corresponds with the data radio bearer based at least in part on the bearer to AC mapping from the WT.

15. The computer program product of claim 9, wherein the data radio bearer is a dedicated bearer.

16. The computer program product of claim 9, wherein the data radio bearer is a default bearer.

17. The computer program product of claim 9, the method further comprising:
- establishing an additional data radio bearer with the UE;
- generating a new WT Modification Request to establish LWA in the UL for the UE with the WT using the additional data radio bearer;
- processing a new WT Modification Request Acknowledge that includes an additional bearer to AC mapping from the WT; and
- generating a new RRCConnectionReconfiguration message indicating the additional bearer to AC mapping to the UE using the information element in the RRC reconfiguration message.

* * * * *